US010609456B2

(12) United States Patent
Petruzzelli et al.

(10) Patent No.: US 10,609,456 B2
(45) Date of Patent: Mar. 31, 2020

(54) INDOOR OVER THE AIR ANTENNA SYSTEMS

(71) Applicant: DISH Technologies L.L.C., Englewood, CO (US)

(72) Inventors: Edmund Petruzzelli, Centennial, CO (US); Danny J. Minnick, Castle Rock, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 15/200,792

(22) Filed: Jul. 1, 2016

(65) Prior Publication Data

US 2017/0318353 A1 Nov. 2, 2017

Related U.S. Application Data

(60) Provisional application No. 62/330,714, filed on May 2, 2016.

(51) Int. Cl.
| H04N 21/61 | (2011.01) |
| H04N 21/438 | (2011.01) |
| H04N 21/4363 | (2011.01) |
| H04N 21/426 | (2011.01) |
| F21V 33/00 | (2006.01) |
| H01Q 1/44 | (2006.01) |
| H04N 21/436 | (2011.01) |
| H04N 21/41 | (2011.01) |
| H01Q 21/00 | (2006.01) |
| F21S 6/00 | (2006.01) |
| F21Y 115/10 | (2016.01) |
| F21V 23/00 | (2015.01) |

(52) U.S. Cl.
CPC ..... *H04N 21/6143* (2013.01); *F21V 33/0052* (2013.01); *H01Q 1/44* (2013.01); *H04N 21/41* (2013.01); *H04N 21/4263* (2013.01); *H04N 21/436* (2013.01); *H04N 21/4363* (2013.01); *H04N 21/4383* (2013.01); *F21S 6/00* (2013.01); *F21V 23/004* (2013.01); *F21Y 2115/10* (2016.08); *H01Q 21/00* (2013.01)

(58) Field of Classification Search
CPC . H04N 21/6143; H04N 21/41; H04N 21/4263
USPC ............................................. 725/68
See application file for complete search history.

(56) References Cited

U.S. PATENT DOCUMENTS

2004/0250273 A1* 12/2004 Swix .................. H04N 21/4122 725/25
2006/0236336 A1* 10/2006 Chen .................... H04N 5/4403 725/37

(Continued)

OTHER PUBLICATIONS

Devolo, "dLAN TV SAT Multituner", Feb. 1, 2013, pp. 0-48, XP055380597, Retrieved from the Internet: URL: https://www.devolo.com/products/Business-Solutions-dLAN-TV-SAT/dLAN-TV-SAT - Multituner/data/Manual-dLAN-TV-SAT-Multituner-com.pdf.

(Continued)

*Primary Examiner* — Nasser M Goodarzi
*Assistant Examiner* — Jaycee Imperial

(57) ABSTRACT

Described are systems and methods for providing improved indoor reception of OTA (Over-the-Air) broadcast signals. The systems described include antenna systems with one or more network interfaces for providing a transport stream received by an antenna to a network.

24 Claims, 12 Drawing Sheets

(56) References Cited

U.S. PATENT DOCUMENTS

| | | | | |
|---|---|---|---|---|
| 2011/0078749 | A1* | 3/2011 | Wieck | H01Q 1/22 |
| | | | | 725/81 |
| 2011/0096243 | A1* | 4/2011 | Casagrande | H04H 60/42 |
| | | | | 348/731 |
| 2011/0141954 | A1* | 6/2011 | Song | H04H 60/11 |
| | | | | 370/310 |
| 2012/0133840 | A1* | 5/2012 | Shirasuka | H04B 7/08 |
| | | | | 348/732 |
| 2013/0227619 | A1* | 8/2013 | Lewis | H01Q 1/007 |
| | | | | 725/81 |
| 2015/0372718 | A1* | 12/2015 | McConnell | H04B 3/544 |
| | | | | 375/257 |

OTHER PUBLICATIONS

Devolo, "Handbuch dLAN TV Sat 1300-HD Powerline Satelliten-Receiver für TV", Jan. 1, 2011, pp. 0-60, XP055380053, Retreived from the Internet: URL: https://www.devolo.com/products/dLAN-TV-SAT/dLAN-TV-Sat-1300-HD/data/Handbuch-dLAN-TV-Sat-1300-HD-de.pdf.
Leontech Limited: "dreambox DM7080 HD User Manual", Apr. 2, 2016, pp. i-82, XP055380033, Retrieved from the Internet: URL: https://web.archive.org/web/20160402182945/dream-multimedia-tv.de/download/dm7080hd-user-manual.pdf.
International Search Report and Written Opinion for PCT/US2017/029393 dated Jun. 21, 2017, all pages.
International Preliminary Report on Patentability for PCT/US2017/029393 dated Nov. 6, 2018, all pages.

\* cited by examiner

INDOOR OVER THE AIR ANTENNA SYSTEMS

CROSS-REFERENCE TO RELATED APPLICATIONS

This application claims the benefit of and priority to U.S. Provisional Application 62/330,714, filed on May 2, 2016, which is hereby incorporated by reference in its entirety for all purposes.

FIELD

This application relates generally to reception of radio frequency broadcasts. More particularly, this application relates to methods for receiving digital over-the-air television and radio broadcasts and related antenna systems.

BACKGROUND

Reliable OTA (Over the Air) DTV (Digital TV) reception poses many problems even on the best day. There are a number of variables that affect reception and not all are under the control of the consumer. Problems span the range of weak signal coverage, to diverse locations of the TV transmission towers, to limitations affecting optimal location of the receiving antenna.

A little known fact that accompanied the DTV OTA transition in 2009 was that the FCC published a set of planning factors that set important assumptions on the consumers receiving capability.

However, in very few instances does the consumer's reception device(s) provide the level of performance assumed by these planning factors. Generally, these conditions will only be met with an outdoor antenna, mounted at the highest point of a single family home and by using an antenna with relatively high gain. The FCC planning factors clearly pointed to a Yagi-Uda (aka Yagi) antenna, originally developed in the 1950s and still in existence today, as the preferred method to receive digital OTA signals for the majority of US consumers.

Generally, installing an outdoor OTA antenna is not an average consumer do-it-yourself (DIY) project. Specialized tools and techniques are required that are not readily available. Achieving an end result of a reliable set of signal within margin can only be determined by specialized radio frequency (RF) test equipment and the knowledge to use them. These facts coupled with a general negative feeling that a Yagi antenna on the roof is unattractive, discourages most consumers from meeting some critical technical metrics outlined in the planning factors.

The limitations and perceptions associated with outdoor OTA antennas have led to a paradigm shift to indoor antennas. There is a wide variety of indoor antenna form factors with many attempting to emulate a dipole in one or more planes. Some are also Omni-directional or attempt or purport to be. While some consumers have success with indoor antennas, many more do not.

SUMMARY

Described herein are systems and methods for providing improved indoor reception of OTA (Over-the-Air) broadcast signals. The systems described include antenna systems with one or more network interfaces for providing a transport stream received by an antenna to a network. The systems described also include receiver systems, such as cable or satellite TV receiver systems, that make use of antenna systems with one or more network interfaces for providing a transport stream received by an antenna to a network.

In a first aspect, provided are systems for receiving one or more over-the-air broadcast signals. In one embodiment, a system for receiving over-the-air broadcast signals comprises a plurality of antenna panels for receiving over-the-air broadcast signals; one or more digital tuners in electronically switchable communication with each of the plurality of antenna panels, the one or more digital tuners for receiving over-the-air broadcast signals and converting received over-the-air broadcast signals to digital transport streams; and a network interface in data communication with the one or more digital tuners, the network interface for transmitting a network transport stream over a network connection, wherein the network transport stream includes at least a portion of the digital transport streams.

Optionally, systems of this aspect function as, are disguised as, or are otherwise incorporated into a piece of furniture or a home furnishing, such as a lamp, lampshade, picture frame, bookshelf, consumer appliance, etc. Optionally, the plurality of antenna panels comprise or are attached to structural elements of the piece of furniture or home furnishing. Optionally, a system of this aspect further comprises a light socket for receiving a light bulb, such as where the plurality of antenna panels are arranged adjacent to or surrounding the light socket. Optionally, the plurality of antenna panels, the one or more digital tuners, and the network interface are located in a modular lampshade, such as a modular lampshade that includes a connector for inserting into a light socket. For example, in some embodiments, connector provides power from the light socket to the one or more digital tuners and the network interface, such as by way of an AC to DC adapter. Optionally, a modular lampshade includes a socket for receiving a light bulb.

A variety of antennas are useful with the systems described herein. For example, in some embodiments, each of the plurality of antenna panels have different absolute orientations. Optionally, two or more of the plurality of antenna panels have different shapes. Optionally, one or more of the plurality of antenna panels comprise a dipole antenna. Optionally, two or more or more of the plurality of antenna panels have different polarization diversities. Useful antennas include, but are not limited to a planar antenna, a directional antenna, an omni-directional antenna, an amplified antenna, and any combination of these.

In some embodiments, other hardware is included in the systems of this aspect in addition to those elements described above. For example, in some embodiments, a system of this aspect further comprises a multiplexer in communication with the one or more digital tuners, such as a multiplexer that generates a network transport stream using one or more digital transport streams. Optionally, in some embodiment, a system of this aspect further comprises a digital storage device in data communication with the one or more digital tuners, such as a digital storage device for storing at least a portion of a digital transport stream.

Optionally, systems of this aspect include network interfaces selected from the group consisting of a WiFi interface, an Ethernet interface, a powerline network interface, and any combination of these. In some embodiments, the network interface is a powerline network interface, the system is incorporated into a lamp, and the lamp and the powerline network interface share a power connection.

Optionally, systems of this aspect comprise two or more digital tuners, such as where at least one of the digital tuners is for periodic or aperiodic scanning of each of a plurality of over-the-air broadcast signals using each of the plurality of antenna panels. The periodic or aperiodic scanning may be used in the creation, population, or updating of a table of over-the-air broadcast channels or radio frequencies and identifiers of a best or selected antenna for use in receiving a digital broadcast on the channel or radio frequency.

Optionally, systems of this aspect may comprise one or more processors in data communication with at least one of the one or more digital tuners and the network interface; and a non-transitory computer readable storage medium in data communication with the one or more processors. In some embodiments, the non-transitory computer readable storage medium comprises instructions that, when executed by the one or more processors, cause the one or more processors to perform operations including identifying a first antenna panel from the plurality of antenna panels for use in receiving a first over-the-air broadcast signal; receiving the first over-the-air broadcast signal using the first antenna panel and a first digital tuner of the one or more digital tuners; converting, using the first digital tuner, the received first over-the-air broadcast signal to a first digital transport stream including a first digital audio stream or a first digital video stream; and transmitting a network transport stream over a network connection, such as a network transport stream that includes at least a portion of the first digital transport stream. Optionally, receiving the network transport stream at a network device facilitates displaying at least one of the first digital audio stream and the first digital video stream.

Optionally, the instructions, when executed by the one or more processors, cause the one or more processors to perform any method or methods described herein.

In another aspect, methods are provided. In some embodiments, a method of this aspect may correspond to a method for receiving one or more over-the-air broadcast signals. In a specific embodiment, a method of this aspect comprises identifying a first antenna panel from a plurality of antenna panels for use in receiving a first over-the-air broadcast signal; receiving the first over-the-air broadcast signal using the first antenna panel and a first digital tuner; converting, using the first digital tuner, the received first over-the-air broadcast signal to a first digital transport stream including a first digital audio stream or a first digital video stream; and transmitting a network transport stream over a network connection, such as a network transport stream that includes at least a portion of the first digital transport stream. Optionally, receiving the network transport stream at a network device facilitates displaying at least one of the first digital audio stream and the first digital video stream.

Optionally, a method of this aspect further comprises identifying a second antenna panel of the plurality of antenna panels for use in receiving a second over-the-air broadcast signal; receiving the second over-the-air broadcast signal using the second antenna panel and a second digital tuner; and converting, using the second digital tuner, the received second over-the-air broadcast signal to a second digital transport stream including a second digital audio stream or a second digital video stream. Optionally, methods of this aspect may further comprise transmitting a second network transport stream over the network connection, wherein the second network transport stream includes at least a portion of the second digital transport stream, and wherein receiving the second network transport stream at a second network device facilitates displaying at least one of the second digital audio stream and the second digital video stream. Optionally, methods of this aspect may further comprise multiplexing at least a portion of the first digital transport stream and at least a portion of the second digital transport stream to form the network transport stream, wherein receiving the network transport stream at the network device facilitates displaying at least one of the first digital audio stream, the first digital video stream, the second digital audio stream, and the second digital video stream.

As described above, various antennas and antenna configurations may be used by the methods and systems described herein. In embodiments, a method of this aspect further comprises switchably establishing a connection between the first antenna panel and the first digital tuner. Optionally, methods of this aspect may further comprise filtering the received over-the-air broadcast signal, amplifying the received over-the-air broadcast signal, or both filtering and amplifying the received over-the-air broadcast signal.

As described above, a list, database, or other table may be used in selection of a particular antenna or antenna panel for use in receiving a particular over-the-air broadcast signal. For example, in some embodiments, identifying the first antenna panel from the plurality of antenna panels includes: compiling a list that identifies a plurality of over-the-air broadcast signals and which of the plurality of antenna panels to use for receiving each of the plurality of over-the-air broadcast signals; and identifying the first antenna panel for use in receiving the first over-the-air broadcast signal using the list. Optionally, compiling the list includes: scanning, by a second digital tuner, each of a plurality of over-the-air broadcast signals using each of the plurality of antenna panels; and identifying a reception metric for each of the plurality of over-the-air broadcast signals and each of the plurality of antennas. Optionally, methods of this aspect may further comprise updating the list one or more times by scanning, by a second digital tuner, each of a plurality of over-the-air broadcast signals using each of the plurality of antenna panels; and identifying a reception metric for each of the plurality of over-the-air broadcast signals and each of the plurality of antennas. Optionally, the list comprises a look-up table and wherein identifying comprises looking up the first over-the-air broadcast signal in the look-up table. Optionally, methods of this aspect may further comprise receiving, from a television receiver, a query for the list; and transmitting the list to the television receiver.

In exemplary embodiments, the plurality of antenna panels and the first digital tuner are components of a system for receiving over-the-air broadcast signals. For example, the system for receiving over-the-air broadcast signals described above may be used. In one specific embodiment, for example, a system for receiving over-the-air broadcast signals comprises the plurality of antenna panels for receiving over-the-air broadcast signals; one or more digital tuners in electronically switchable communication with each of the plurality of antenna panels, the one or more digital tuners for receiving over-the-air broadcast signals and converting received over-the-air broadcast signals to digital transport streams; and a network interface in data communication with the one or more digital tuners, the network interface for transmitting a network transport stream over a network connection, wherein the network transport stream includes at least a portion of the digital transport streams.

In another aspect, television receivers are provided. In some embodiments, a television receiver comprises: one or more processors; an audio-video output connection in data communication with the one or more processors; a network interface in data communication with the one or more processors; and a non-transitory computer readable storage medium in data communication with the one or more processors, the non-transitory computer readable storage medium comprising instructions that, when executed by the one or more processors, cause the one or more processors to perform operations including: generating a first video signal for displaying a receiver interface using the audio-video output connection; receiving a command to obtain, using the network interface, a network transport stream from a system for receiving over-the-air broadcast signals, such as a system for receiving over-the-air broadcast signals that comprises: a plurality of antenna panels for receiving over-the-air broadcast signals; one or more digital tuners in electronically switchable communication with each of the plurality of antenna panels, the one or more digital tuners for receiving over-the-air broadcast signals and converting received over-the-air broadcast signals to digital transport streams; and a network interface in data communication with the one or more digital tuners, the network interface for transmitting a network transport stream over a network connection, wherein the network transport stream includes at least a portion of the digital transport streams; transmitting a query using the network interface, such as a query that includes a request for the network transport stream; receiving the network transport stream using the network interface; and generating a second video signal for displaying video corresponding to the network transport stream using the audio-video output connection.

In embodiments, the operations further include: transmitting a second query using the network interface, such as a second query that includes a request for reception metrics for at least a portion of the plurality of antenna panels for each of the plurality of over-the-air broadcast signals; receiving the reception metrics; and generating a third video signal for displaying the reception metrics using the audio-video output connection.

Optionally, the system for receiving over-the-air broadcast signals comprises any such system described herein.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
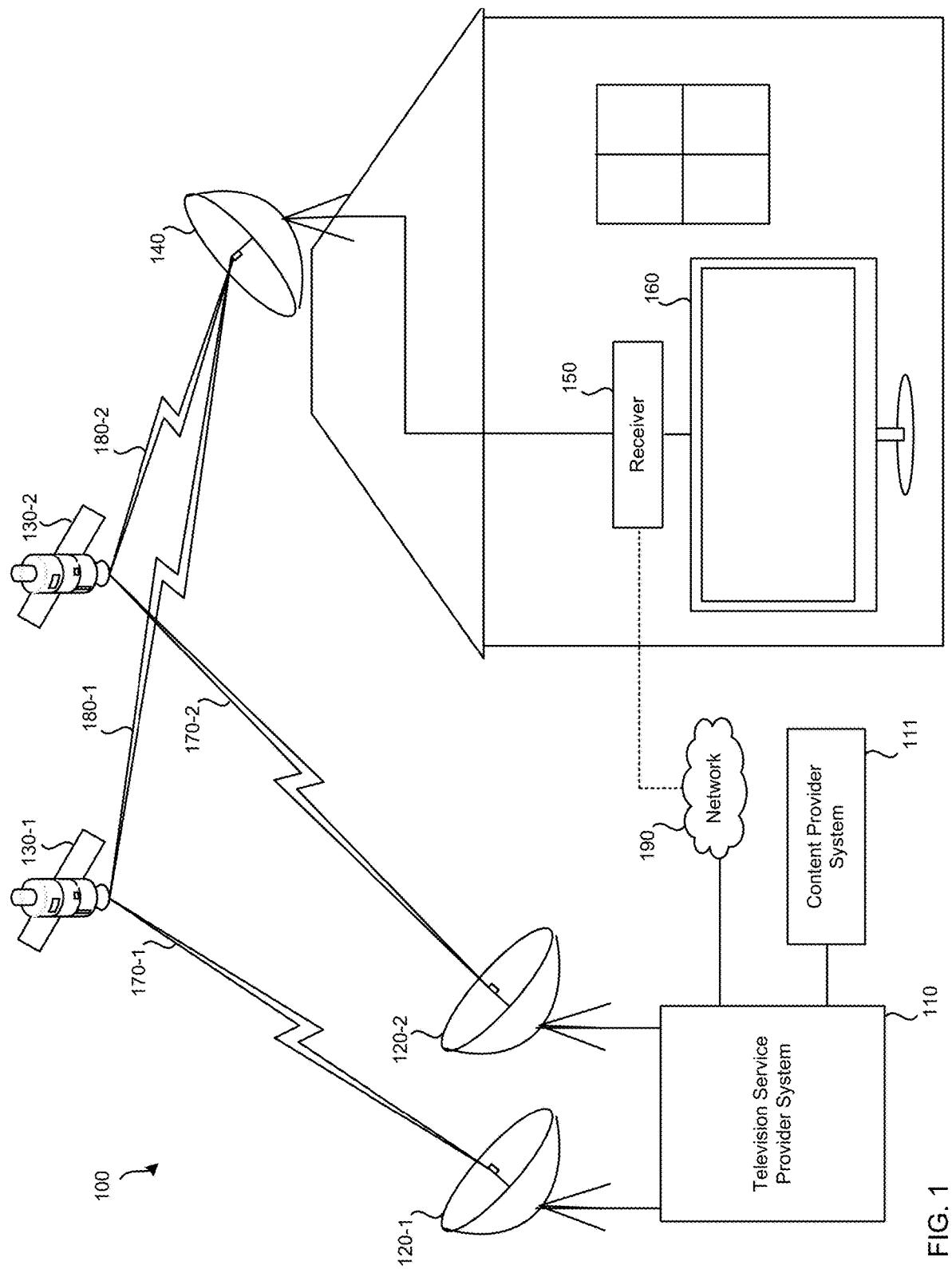
FIG. 1 illustrates an embodiment of a satellite television distribution system.

Using OTA DTV indoor antennas introduces a host of new potential reception inhibiting factors, not anticipated in the planning for DTV coverage and reception. Most notable of these conditions are: 1) a weaker signal due to attenuation (loss) through a buildings outside walls, and 2) uncontrolled bouncing of signals within the room where the indoor antenna would be located.

The effect of loss is a reduction in the TV station's coverage area and/or reduced margin for acceptable reception under normal variations of a transmitted RF signal; i.e., rain or foliage. The effect of bouncing signals is a condition known as multipath, where the same desired signal may enter the antenna from different paths and corrupt or, in extremes, cancel one another for that channel. Multipath is the same condition known as "ghosting" in the context of analog broadcast television. A digital television (DTV) signal does not ghost, but the same distortion mechanism results in degraded signal conditions that limit or inhibit reception. Multipath is a variable of many factors and nearly impossible to predict or correct when it is severe. Other signal degradation aspects may need to be taken into consideration, including moving obstructions in an environment that may absorb a signal or may contribute to multipath, such as a human body.

Advanced antenna and receiver design techniques may be applied to overcome some of the limitations of indoor OTA antenna's but there may be undesirable factors associated with both.

Indoor OTA Antenna Limitations:

Most suppliers of indoor OTA antennas for DTV reception strongly recommend that the antenna be placed at a window location as high as possible within the home. This is not always possible nor is it practical if the home does not have a window facing the general direction of the TV broadcast towers. The more the antenna is moved from quasi line of sight orientation the more the effects of multipath come into play. Since, in many situations, the central TV viewing location is on the first floor of a home, placing the indoor OTA antenna in a second floor window and cabling to the primary TV location is a nonstarter, aesthetically or practically.

The second condition that happens in indoor OTA antenna is the inability to receive all the available broadcast TV stations in that market. This condition may be caused by a number of factors, but a common complaint is having to move the antenna around the room to receive a particular TV station that could not be received from another location in the same room. This may be an effect of multipath. Usually, a compromise location must be selected that still leaves one or more desired TV stations not available on that TV.

Technology Solutions:

There are two technical solutions described herein to improve reception probability for digital OTA TV broadcasts. One technique uses what is referred to as smart antennas and the other uses one or more diversity reception techniques. Certain diversity reception techniques use some of the same decision making capabilities used in smart antennas. In many respects, the smart antennas derive from basic diversity theory; however, this discussion will exploit a few fundamental differences to make the respective points to compare the two methods.

Smart Antennas:

Smart antennas obtain their "smarts" by using specific parametric feedback from the DTV tuner and/or demodulator(s) to select the best antenna element or antenna sector to deliver the requested TV signal on a per channel basis.

Usually a smart antenna requires some communications between the host device, such as a set top box, and the antenna. Various communications schemes have been used and proposed, the most notable being CEA-909B, which was an initiative of the CEA from 2007-2010. This protocol allowed for controlling up to 64 antenna elements as well as control of pre-amplifier gain on a per channel basis. Unfortunately, there was not wide adoption of CEA-909B by either the ATSC demodulator IC providers or TV manufacturers.

Diversity Antennas:

Diversity reception is similar to basic smart antenna technology, with the differences being that there is not a specific control protocol and that it does not provide for control feedback from the antenna. The most simple diversity technique is "Switched Diversity." In this technique, two or more antenna elements are used. The elements may be scanned automatically or manually and the received signals are monitored for some signal quality metric.

The receiver may store a table including channel identifiers vs. best antenna element to assist and speed up the subsequent channel changing requests. The receiver may periodically re-scan as a background task to check for changing reception conditions. This may be an automatic process and/or a manual process initiated by the consumer. An additional and/or non-user accessible tuner module may be included in a receiver system to implement a channel scan for continuously, periodically, or aperiodically updating a channel/antenna table.

Some embodiments use switched diversity and a total of four or more separate antenna elements. The elements may be arranged generally with 90 degree separation from one another, for example. To visualize this, one element is looking North and the other three are looking East, South, and West respectively, for example. In simple terms, this allows OTA TV reception from all four compass points, each considered optimally. Optionally, the antenna elements are arranged with opposing or different polarization senses or plane orientations in order to achieve polarization diversity among the antenna elements.

FIG. 1 illustrates an embodiment of a satellite television distribution system 100. Satellite television distribution system 100 may include: television service provider system 110, satellite transmitter equipment 120-1 and 120-2 (collectively, satellite transmitter equipment 120), satellites 130-1 and 130-2 (collectively, satellites 130), satellite dish 140, receiver 150, and television 160. Alternate embodiments of satellite television distribution system 100 may include fewer or greater numbers of components. While only one satellite dish 140, receiver 150, and television 160 (collectively referred to as "user equipment") are illustrated, it will be appreciated that multiple (e.g., tens, thousands, millions) instances of user equipment may receive television signals from satellites 130. For example, a particular person may have user equipment at multiple homes or other locations.

Television service provider system 110 and satellite transmitter equipment 120 may be operated by a television service provider. A television service provider may distribute television channels, on-demand programming, programming information, and/or other services to viewers. Television service provider system 110 may receive feeds of one or more television channels from various sources, such as content provider system 111. Content provider system 111 may provide television programs, advertisements, and other forms of content. For example, content provider system 111 may be a television network, such as ESPN®. To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. Such satellite feeds may be unidirectional—user equipment may not be able to transmit information back to television service provider system 110 via satellites 130. While a single television service provider system 110 and two satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels and content may be transmitted to satellites 130 from different instances of transmitting equipment. For instance, a different satellite dish of transmitting equipment 120 may be used for communication with satellites in different orbital slots.

Satellites 130 may be configured to receive signals, such as streams of television channels, from one or more satellite uplinks, such as from satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170-1 and 170-2 (collectively, uplink signals 170) from downlink signals 180-1 and 180-2 (collectively, downlink signals 180). Satellites 130 may be in geosynchronous orbit. Each satellite 130 may be in a different orbital slot, such that the signal path between each satellite, uplink stations, and user equipment vary. Multiple satellites 130 may be used to relay television channels from television service provider system 110 to satellite dish 140. Different television channels may be carried using different satellites.

Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite uplink 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of receiver 150 and/or satellite dish 140, it may only be possible to capture transponder streams from a limited number of transponders concurrently. For example, a tuner of receiver 150 may only be able to tune to a single transponder stream from a transponder of a single satellite at a time.

Figure 9:
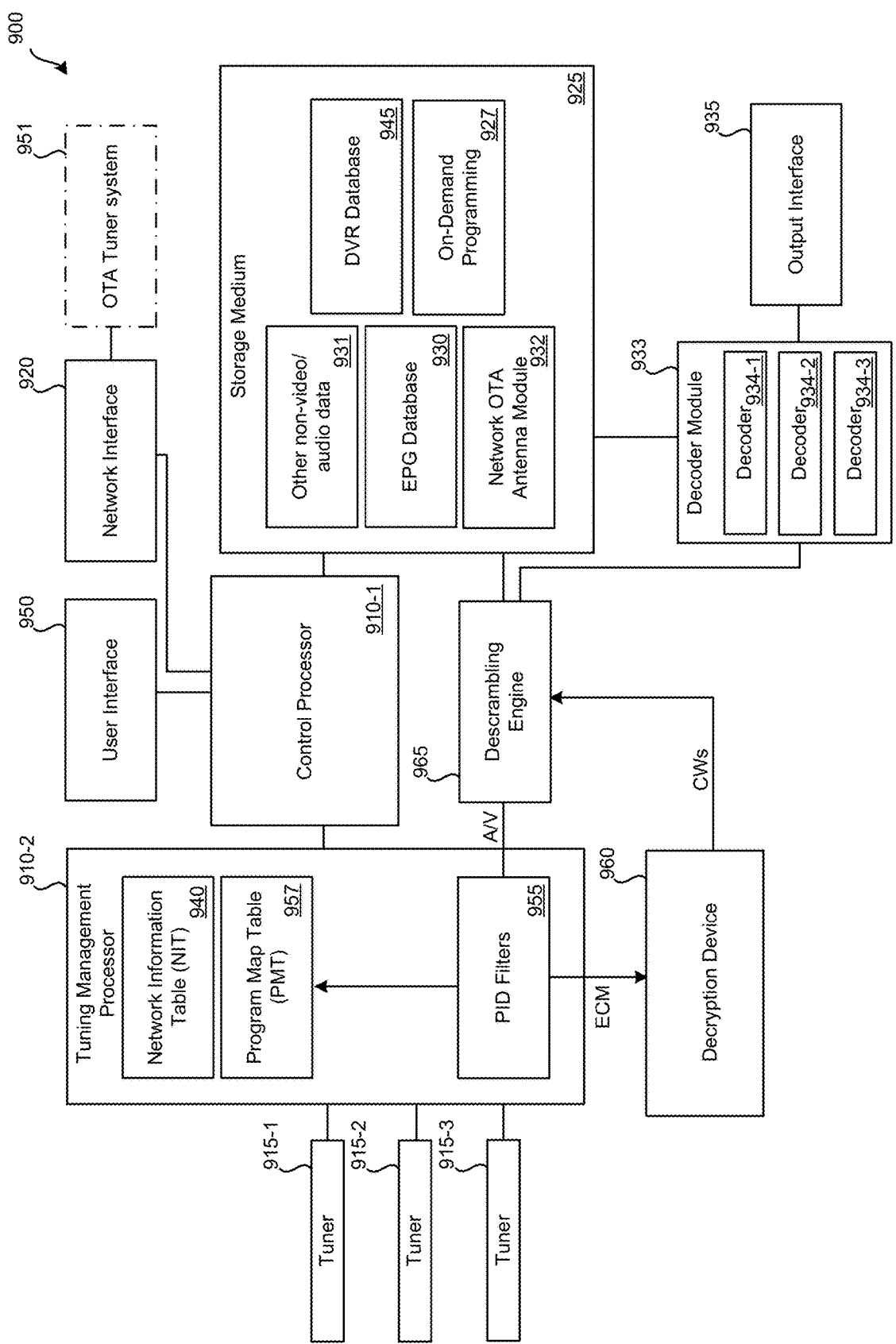
FIG. 9 provides a block diagram illustration of a television receiver that uses a system for receiving over-the-air broadcast signals, in accordance with some embodiments.

In communication with satellite dish 140, may be one or more sets of receiving equipment. Receiving equipment may be configured to decode signals received from satellites 130 via satellite dish 140 for display on a display or presentation device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of receiver 150, which may be a STB. Alternatively, receiver 150 may be integrated directly into television 160. Receiver 150 may thus decode signals received via satellite dish 140 and provide an output to television 160. FIG. 9 provides additional detail of receiving equipment.

Television 160 may be used to present video and/or audio decoded by receiver 150. Receiver 150 may also output a display of one or more interfaces to television 160, such as an electronic programming guide (EPG). In some embodiments, a display device other than a television may be used. Optionally, receiver 150 may include hardware or components for receiving broadcast television channels and may, for example, include aspects of receiver 250 depicted in FIG. 2.

Uplink signal 170-1 represents a signal between satellite uplink 120-1 and satellite 130-1. Uplink signal 170-2 represents a signal between satellite uplink 120-2 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay 32 transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. Receiver 150 may decode the received transponder stream. As such, depending on which television channel(s) are desired, a transponder stream from a different satellite (or a different transponder of the same satellite) may be accessed and decoded by receiver 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and receiver 150. Via such a secondary communication channel, bidirectional exchange of data may occur. As such, data may be transmitted to television service provider system 110 via network 190. The connection between network 190 and receiver 150 is illustrated as dotted since this connection allowing communications from receiver 150 to be sent to television service provider system 110 may not be available (e.g., receiver 150 may not have such communication capabilities, receiver 150 may have such capabilities but may not be connected with network 190). For example, even if a receiver is capable of communicating using network 190, communication using network 190 may require that the user has an active account with an internet service provider. Accordingly, some receivers may only be able to receive data from satellites 130 via receiving equipment, such as satellite dish 140. In other situations, while a user may have an active ISP account, such as via a fiber, cable, or DSL internet connection, equipment failure may occur. For instance, a router through which receiver 150 connects to network 190 may fail or be in need of resetting. Network 190 may be or include the Internet.

FIG. 1 illustrates an example of a satellite-based television channel distribution system. It should be understood that at least some of the aspects of the satellite-based television channel distribution system may be similar to a cable television distribution system. For example, in a cable television system, rather than using satellite transponders, multiple RF channels on a coaxial cable may be used to transmit streams of television channels. Alternatively or additionally, digital data may be transmitted across fiber optic cables. As such, aspects detailed herein may be applicable to cable television distribution systems. Other forms of television distribution networks include broadcast over-the-air systems and IP-based distribution systems.

Figure 2:
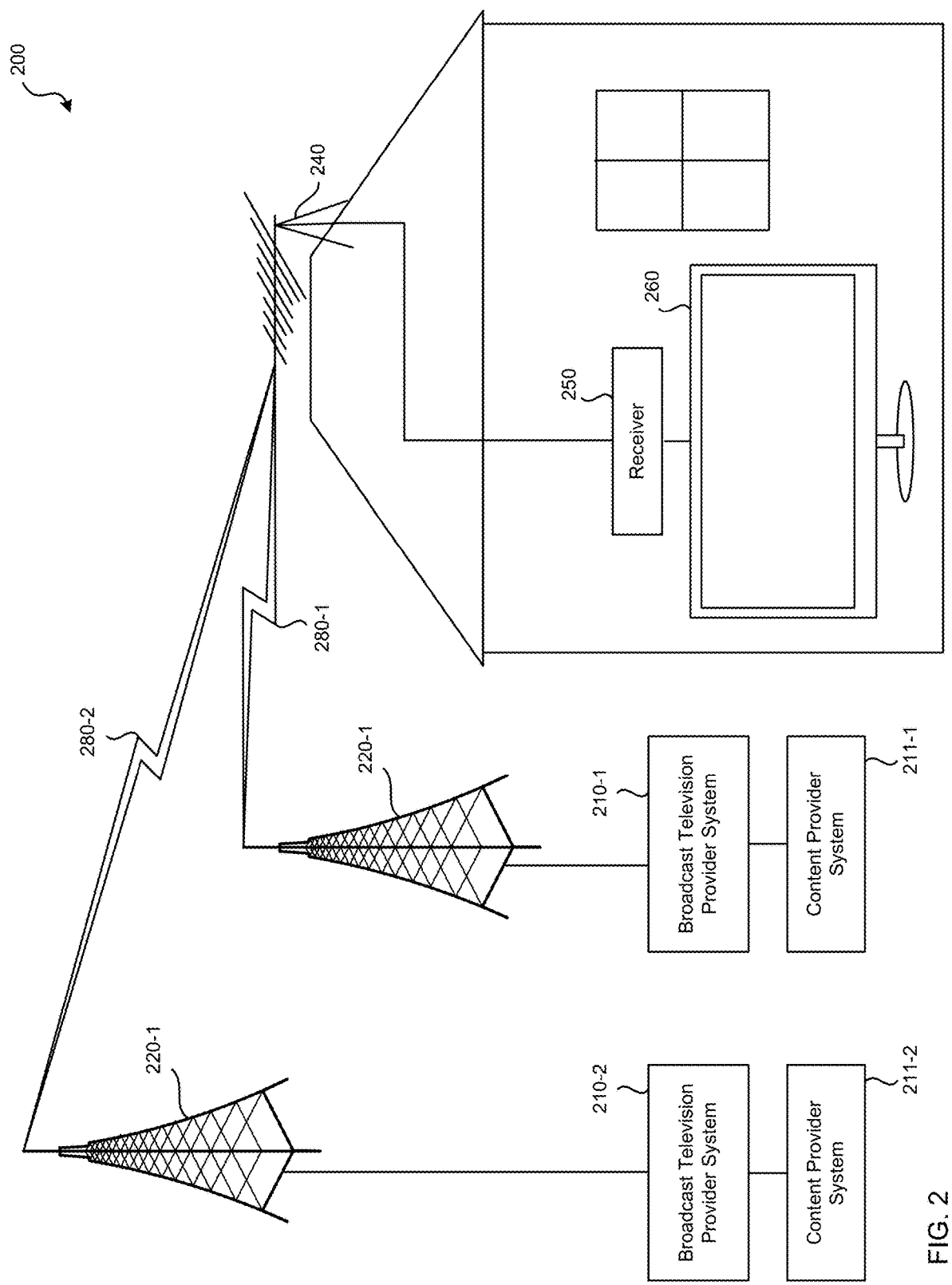
FIG. 2 illustrates an embodiment of a terrestrial broadcast television system.

FIG. 2 illustrates an embodiment of a terrestrial broadcast television system 200. Broadcast television system 200 may include elements similar to satellite television broadcast distribution system 100, and may include: broadcast television provider system 210-1 and 210-2 (collectively, broadcast television provider system 210), transmitter equipment 220-1 and 220-2 (collectively, transmitter equipment 220), antenna 240, receiver 250, and television 260. Transmitter equipment 220 may include one or more broadcast antennas for transmitting radio frequency broadcasts. Receiver 250 may include one or more tuner devices for receiving and decoding broadcast signals received at antenna 240. Alternate embodiments of broadcast television system 200 may include fewer or greater numbers of components. While only one antenna 240, receiver 250, and television 260 (collectively referred to as "user equipment") are illustrated, it will be appreciated that multiple (e.g., tens, thousands, millions) instances of user equipment may receive the broadcasted television signals from transmitter equipment 220.

Broadcast television provider system 210 and transmitter equipment 220 may be operated by a broadcast television service provider. A broadcast television service provider may distribute television channels using radio frequency broadcasts. Broadcast television service provider system 210 may receive feeds of one or more television channels from various sources, such as a content provider system. A content provider system may provide television programs, advertisements, and other forms of content. For example, content provider system may be a television network, such as ABC®. To distribute such television channels to users, feeds of the television channels may be relayed to user equipment via one or more transmitters via broadcast digital transport streams. Transmitter equipment 220 may be used to transmit a feed of one or more television channels from television service provider system 210 for reception by an antenna 240. Such broadcasts are generally unidirectional—user equipment may not be able to transmit information back to television service provider system 210 via antenna 240. Although two broadcast television provider systems 210 and two transmitter equipment 220 are illustrated as part of broadcast television system 200, it should be understood that one or more instances of transmitter equipment may be used, possibly scattered geographically. In addition, independent broadcast networks may use their own set of one or more transmitter equipment and systems for broadcasting different television channels.

Antenna 240 may be configured to receive signals, such as streams of television channels, from one or more transmitter equipment 220. Broadcast signals 280-1 and 280-2 are depicted as being transmitted from transmitter equipment 220-1 and 220-2, but it will be appreciated that transmitter equipment 220 generally broadcasts streams of television channels over large areas for reception by any appropriate antenna for displaying the broadcast television channel streams without regard to whether any other antennas are receiving the broadcast signals.

In addition, different television channels may be carried on a single broadcast signal 280 using digital subchannels. As an example, a first television channel may be carried on a first digital subchannel of broadcast signal 280 and a second television channel may be carried on a second digital subchannel of broadcast signal 280. In this way, a broadcast television provider may simultaneously broadcast multiple television channel streams using a single transmitter equipment 220 for simultaneous reception by a single antenna 240 and receiver 250.

Antenna 240 may be a piece of user equipment that is used to receive broadcast digital transport streams from one or more transmitters, such as transmitter equipment 220. Antenna 240 may be installed by a user at a suitable point for reception of broadcast signals 280. Antenna 240 may be an omnidirectional antenna, a directional antenna, an amplified antenna, a planar antenna, etc., depending on the configuration. Based on the characteristics of receiver 250 and/or antenna 240, it may only be possible to capture broadcast digital transport streams from a limited number of transmitter equipment concurrently. For example, a tuner of receiver 250 may only be able to tune to a single digital transport stream on a single radio frequency at a time. Receiver 250, however, may include multiple tuners to overcome this limitation.

Figure 7:
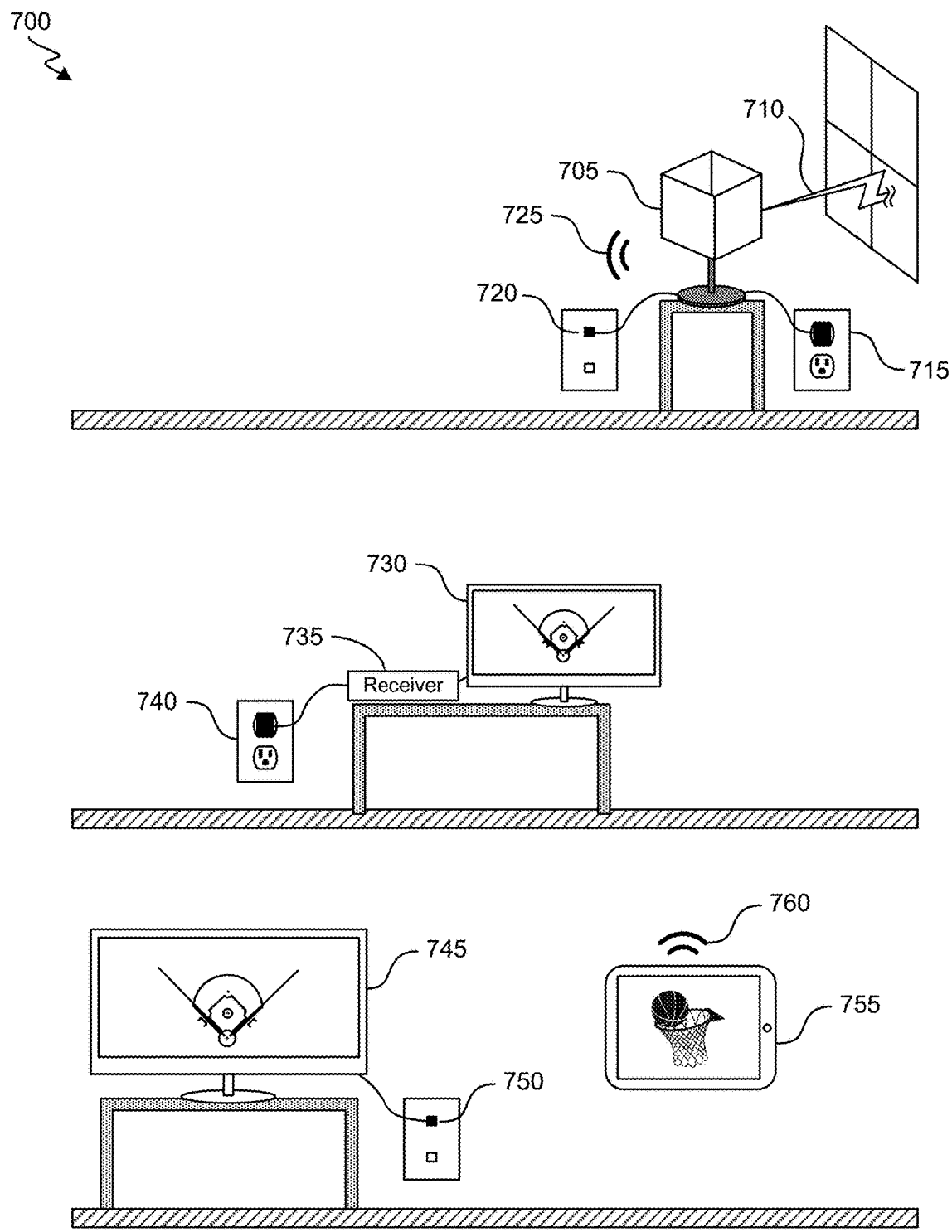
FIG. 7 provides a schematic illustration depicting use of a system for receiving over-the-air broadcast signals, in accordance with some embodiments.

Receiver 250 may be configured to decode signals received from transmitter equipment 220 via antenna 240 for display on a display or presentation device, such as television 260. Receiver 250 may be incorporated as part of a television or may be part of a separate device, such as a set-top box (STB). Receiver 250 may include tuner configured to receive broadcast television signals. Receiver 250 may thus decode signals received via antenna 240 and provide an output to television 260. FIGS. 7 and 9 provides additional detail of a receiver.

Television 260 may be used to present video and/or audio decoded by receiver 250. Receiver 250 may also output a display of one or more interfaces to television 260, such as an electronic programming guide (EPG). In some embodiments, a display device other than a television may be used. Optionally, receiver 250 may include hardware or components for receiving satellite television channels and may, for example, include aspects of receiver 150 depicted in FIG. 1.

Broadcast signal 280-1 represents a signal between transmitter equipment 220-1 and antenna 240. Broadcast signal 280-2 represents a signal path between transmitter equipment 220-2 and antenna 240. Each of broadcast signals 280 may contain one or more different television channels in the form of digital transport streams. For example, broadcast signal 280-1 may include a first digital transport stream containing a first group of television channels, while broadcast signal 280-2 may include a second digital transport stream containing a different group of television channels. Transmitter equipment 220 may transmit multiple digital transport streams to user equipment. For example, a typical transmitter equipment may relay a digital transport stream including one or more television channels in the form of a multiplexed transport stream.

Figure 3:
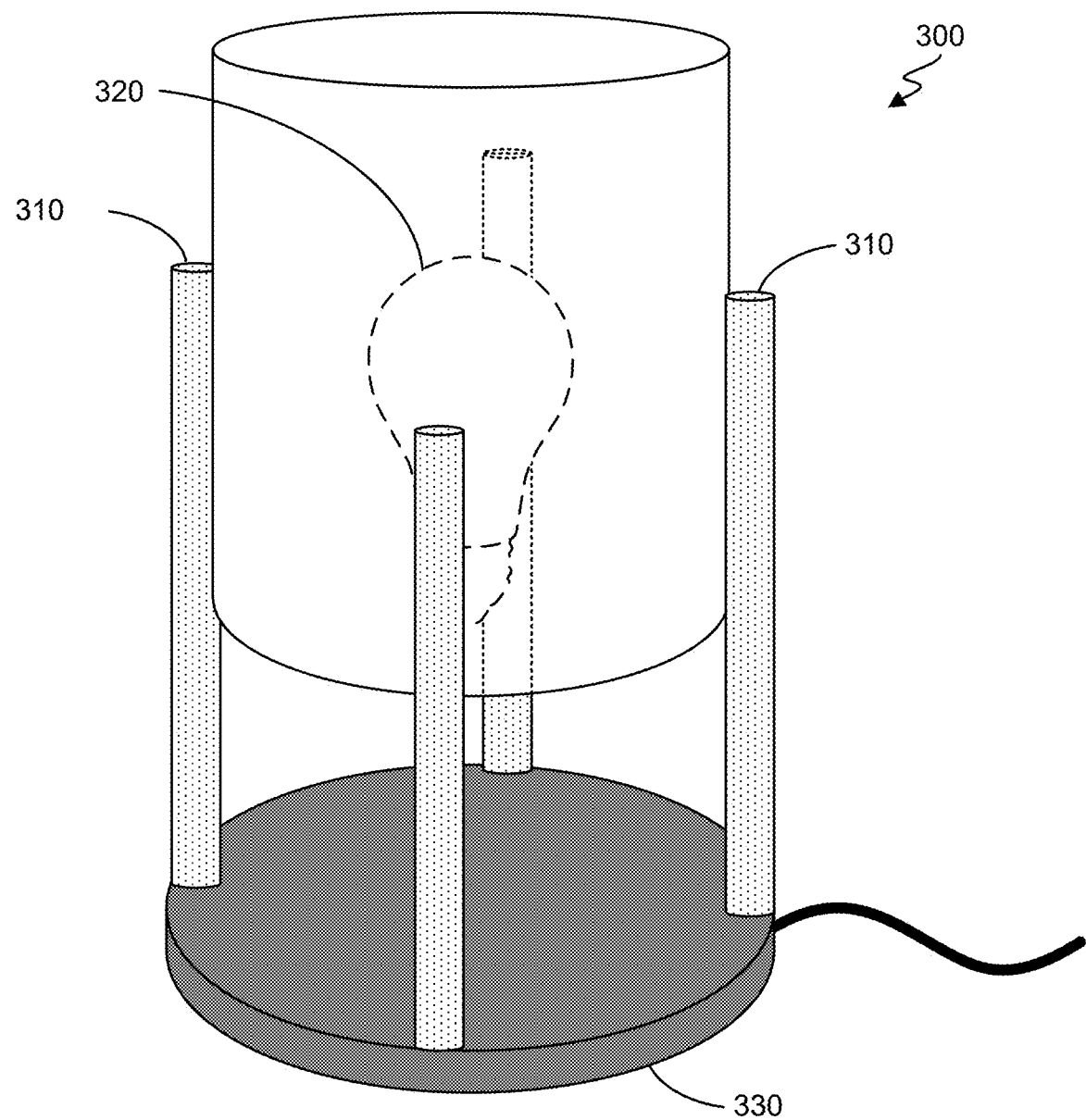
FIG. 3 provides a schematic illustration of a system for receiving over-the-air broadcast signals, in accordance with some embodiments.

FIG. 3 depicts a schematic illustration of an exemplary over-the-air (OTA) tuner system, also referred to herein as a system for receiving over-the-air broadcast signals. OTA tuner system 300 includes four separate antenna elements 310 arranged around a lamp containing a single light bulb 320. For purposes of illustration, a light socket is not shown in FIG. 3 to simplify depiction of the other features of the OTA tuner system 300. It will be appreciated that various configurations embodying the OTA tuner system concept may be used. Accompanying hardware elements, such as one or more tuners/demodulators, switch matrix, amplifiers controllers, network interfaces, processors, etc., may be included in the OTA tuner system 300, such as housed in the base 330. In some embodiments, the antennas and any accompanying hardware may be housed in a lampshade, which may allow the antenna system to be retrofit to an existing lamp or light fixture. In some embodiments, the antennas and any accompanying hardware may be housed in or attached to a light fixture.

Optionally, the light bulb 320 may be a light-emitting diode (LED) based bulb. The use of LED bulb(s) may provide for a power saving and aesthetically pleasing design, though incandescent and fluorescent (e.g., compact fluorescent) bulbs may also be used. It will be appreciated that different types of bulbs may require different shielding and/or signal protection for the antennas and any accompanying hardware to reduce the electromagnetic emission from the bulb that may cause undesired interference.

Although embodiments described herein have been described with reference to a light fixture, it will be appreciated that other configurations are possible. For example, the antenna and associated hardware components may be incorporated in appliances and other home furnishings, such as picture frames, bookshelves, office furniture, etc., so that the antennas and associated hardware may be disguised and/or hidden from view. Incorporation into a light fixture, however, may be useful, as some embodiments may naturally be placed in higher areas of a home or office that may receive stronger OTA transmission signals or may encounter less interference and/or attenuation than if placed elsewhere in a home or office.

Figure 4:
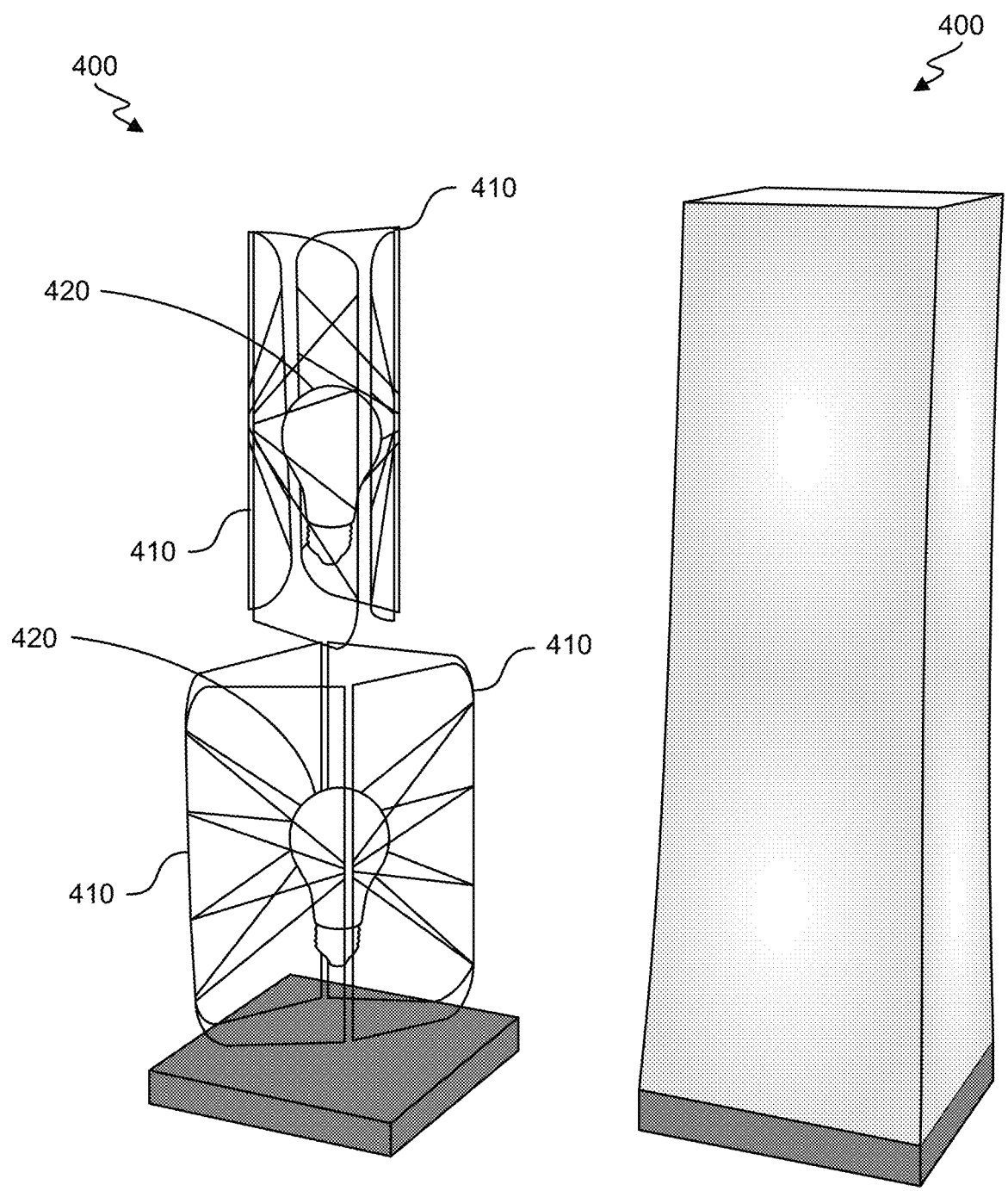
FIG. 4 provides schematic illustrations of a system for receiving over-the-air broadcast signals, in accordance with some embodiments.

FIG. 4 depicts a schematic illustration of another OTA tuner system 400 embodiment shown with (right) and without (left) a lampshade. This embodiment includes a plurality of antennas 410 arranged in different configurations around the light bulbs 420. For purposes of illustration, light sockets are not shown in FIG. 4 to simplify depiction of the other features of the OTA tuner system 400. A base 430 is included to support the antennas 410, as well as to house accompanying hardware elements, such as such as one or more tuners/demodulators, switch matrix, amplifiers controllers, network interfaces, processors, etc.

The antennas used in some embodiments may correspond to flexible antenna panels, though a variety of antenna configurations are useful with the aspects described herein. For example, useful antennas include, but are not limited to, a planar antenna, a directional antenna, an omni-directional antenna, or an amplified antenna.

Figure 5:
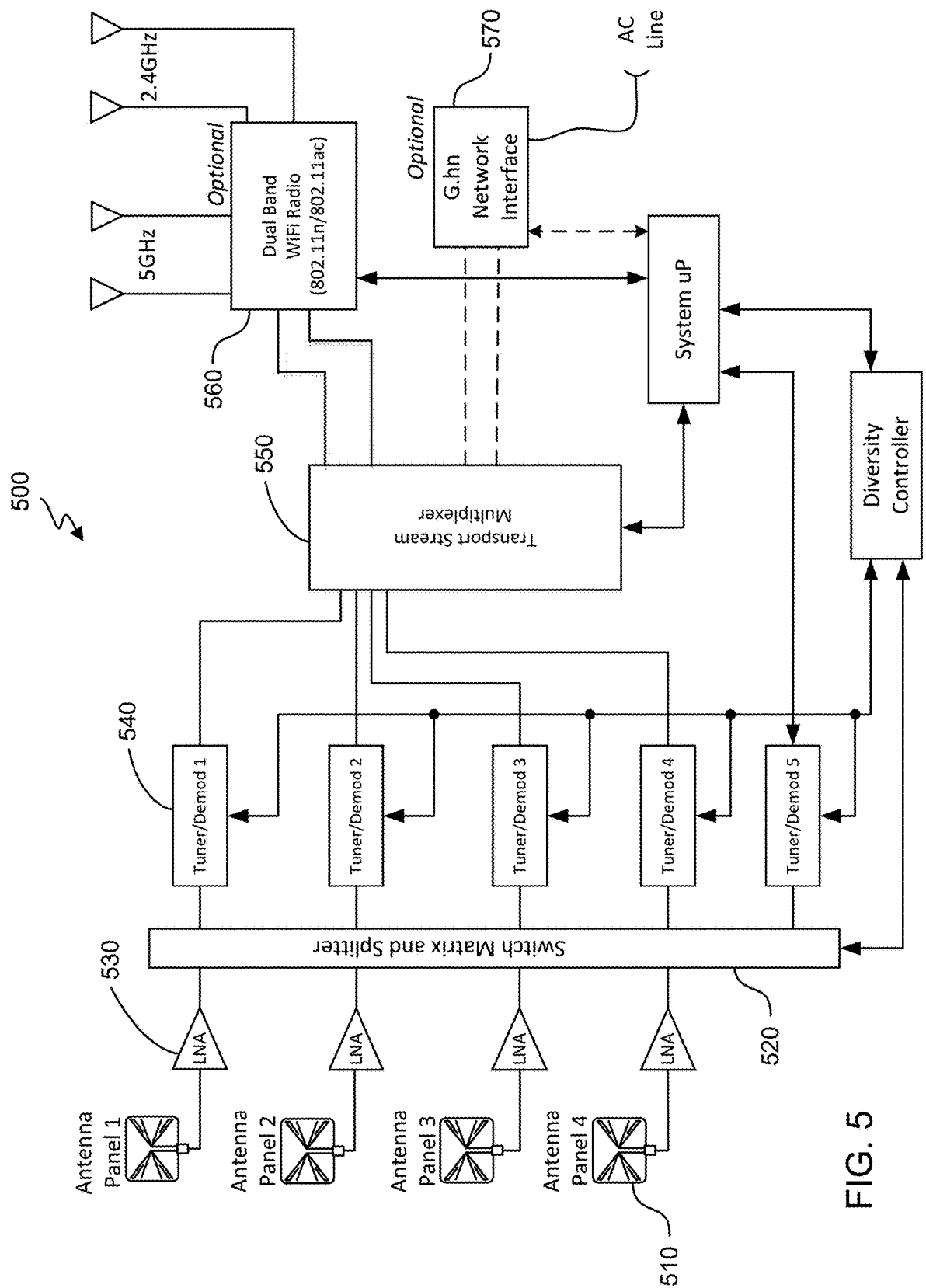
FIG. 5 provides a block diagram of components of a system for receiving over-the-air broadcast signals, in accordance with some embodiments.

FIG. 5 provides a block diagram of an RF subsystem 500 of an OTA tuner system, in accordance with some embodiments. It will be appreciated that more or fewer elements than depicted in FIG. 5 may be used in various OTA tuner system embodiments. RF subsystem 500 includes a plurality of antenna panels 510, which may be connected to a switch matrix and splitter 520, such as by one or more amplifiers 530. A plurality of tuner/demodulators 540 are connected to switch matrix and splitter 520, which allows each tuner/demodulator 540 to independently connect to any of the antenna panels 510. It will be appreciated that two or more tuner/demodulators 540 may simultaneously connect to one antenna panel 510. As illustrated, four tuner/demodulators 540 allow for simultaneously receiving four different OTA signals at four different broadcast frequencies using any of the four antenna panels 510. A fifth tuner/demodulator 540 allows for continuous scanning of frequencies using the different antenna panels 510 in order to keep a table of channels and channel characteristics updated. This may allow for continuous updating of a list of best antennas to use for particular channels.

The RF subsystem 500 of FIG. 5 optionally allows the transport streams received from each of the different tuners to be multiplexed in any combination and transmitted over a network using transport stream multiplexer 550 and WiFi Radio 560 or G.hn interface 570. It will be appreciated that G.hn interface 570 may allow for network communications over one or more wired systems, such as a powerline or telephone line system. It will also be appreciated that other network interfaces may be used in place of WiFi Radio 560 and/or G.hn interface 570, such as an Ethernet interface or HomePlug interface. Use of powerline interfaces, such as G.hn or HomePlug may be particularly advantageous, for some embodiments, as these interfaces may not require a separate connection to a network, may share an AC line power connection with the light socket and use the shared connection to transmit the transport streams over a powerline network. Various controllers and system microprocessors may also be included in the RF subsystem 500.

Optionally, one or more WiFi antennas for one or more WiFi Radios may be included in the OTA tuner system, such as WiFi antennas optimized for receiving and/or transmitting wireless network signals, such as in a 2.4 GHz or 5 GHz band. For example, the WiFi antenna(s) may be incorporated into an OTA tuner system as a separate antenna component or integrated into one or more antenna panels.

As described with reference to FIGS. 6A-6D, power for the RF subsystem may be obtained, in some embodiments, using a power connection that screws into a light socket on a lamp or light fixture, for example. Optionally, power for the RF subsystem may be obtained using a power connection shared between a light fixture and the RF subsystem. In this way, only a single AC power connection may need to be established with the OTA tuner system for both a light bulb and the RF subsystem. In some embodiments, the system may include a light socket or other connection for attaching a light bulb or light emitting device, such as an LED array.

Various embodiments may also incorporate storage subsystems to allow RF subsystem 500 to function as a digital video recorder (DVR) system. Advantageously, multiple tuners in the antenna system may simultaneously and independently tune a single channel using different antennas in the system, which may be useful when signal loss is encountered when using a single antenna and tuner. In some embodiments, multiple video signals independently received by different tuners using different antennas may be used to stitch together a single uninterrupted video stream.

In embodiments, RF subsystem 500 is incorporated into an OTA receiver system. Optionally, RF subsystem 500 is incorporated into a cable or satellite television receiver. In this way, the cable or satellite television receiver may serve a dual function of receiving both cable/satellite broadcasts as well as OTA broadcasts. Further, such a configuration may allow the cable or satellite television receiver to serve cable, satellite and/or OTA to other devices over a network, such as a wired or wireless network.

Figure 6A:
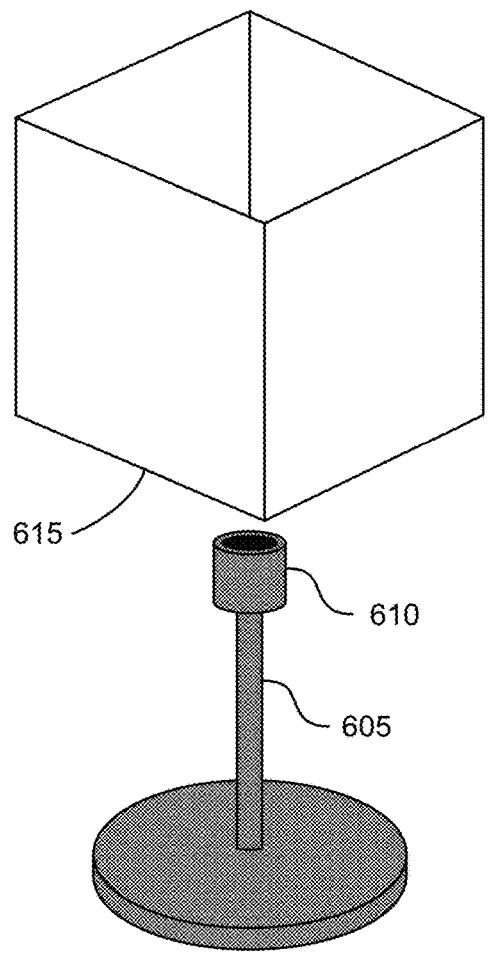
FIG. 6A, FIG. 6B, FIG. 6C, and FIG. 6D provide schematic illustrations of a system for receiving over-the-air broadcast signals, in accordance with some embodiments.

FIG. 6A, FIG. 6B, FIG. 6C, and FIG. 6D provide schematic illustrations of a modular or retrofit OTA tuner system 600 embodiment. In FIG. 6A, a lamp 605, which includes a light socket 610, and a lampshade 615 are illustrated. Lampshade 615 may include components of RF subsystem 500 depicted in FIG. 5. The lampshade 615 may be a separate component from lamp 605, which may allow an OTA tuner system to be added to any existing lamp or light fixture. Lampshade 615 may include elements of a traditional lampshade, such as a diffusive covering(s).

Figure 6B:
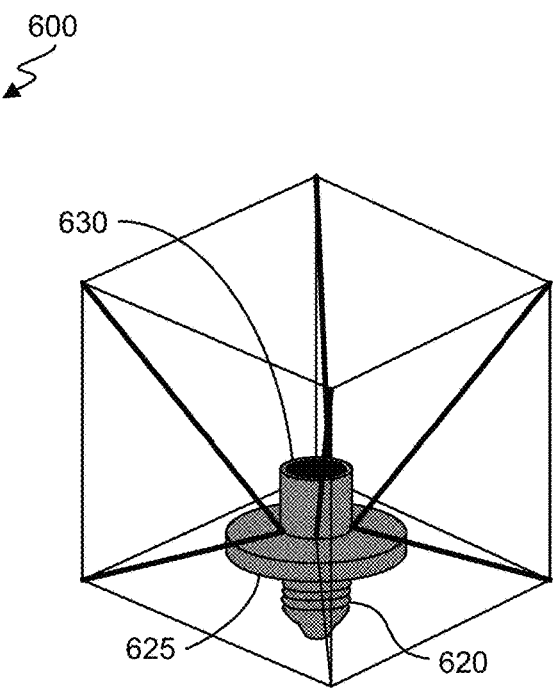

FIG. 6B illustrates lampshade 615 with the diffusive covering(s) removed, and shows an included socket adapter 620, housing 625, and light socket 630. Socket adapter 620 allows for connection to the light socket 610 of lamp 605 to obtain electric power for the RF subsystem of OTA tuner system 600. Housing 625 includes, for example, components of RF subsystem 500 depicted in FIG. 5. It will be appreciated that although housing 625 is illustrated as positioned between socket adapter 620 and light socket 630, other configurations are possible, such as where housing 625 is positioned at the lampshade 615 or above light socket 630. Further, it will be appreciated that light socket 630 is an example light bulb connector only and that other configurations are possible, such as where light socket 630 is a plug-in socket, rather than a screw-in socket, or where light socket 630 provides a DC connection to a light bulb or lamp, such as an LED, incandescent, or fluorescent bulb.

Figure 6C:
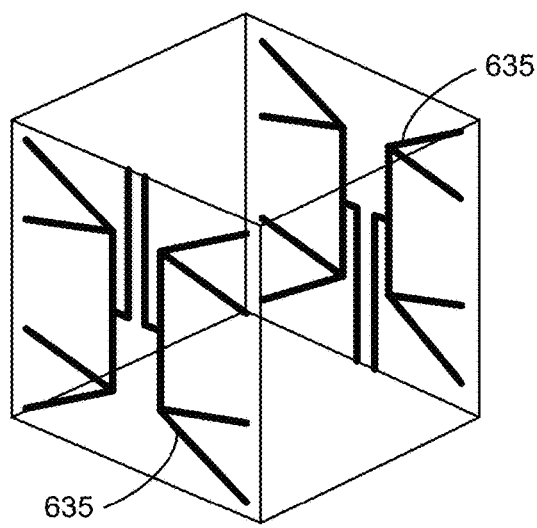
Figure 6D:
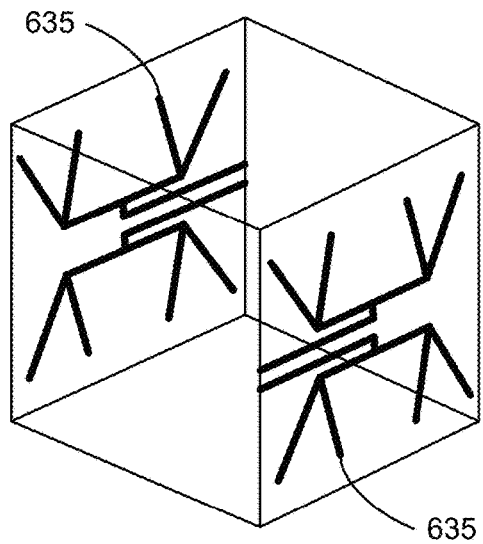

FIGS. 6C and 6D provide designs for example antenna panels 635, which may be included in lampshade 615. The antenna panels 635 may be oriented in different configurations or have different polarization diversity to allow for more robust reception of broadcast signals. Each antenna panel 635 may be in independent switchable communication with one or more tuners included in housing 625 to allow each tuner to make use of any one of antenna panels 635 for receiving a particular broadcast signal.

It will be appreciated that although four antenna panels 635 are illustrated in the OTA tuner system 600 of FIG. 6, more or fewer antennas may be included in the OTA tuner systems described herein. For example, in various embodiments, the OTA tuner system may include 2, 3, 4, 5, 6, 7, 8, 9, 10, or more antennas, each having orientation or polarization diversity characteristics independent of the other antennas.

FIG. 7 provides a schematic illustration of the use of an OTA tuner system 705 in a broadcast signal reception environment 700. Environment 700 includes OTA tuner system 705, which receives broadcast signal 710. OTA tuner system 705 may include, for example, aspects of OTA tuner system 300, OTA tuner system 400, RF subsystem 500, or OTA tuner system 600 depicted with reference to FIGS. 3, 4, 5, 6A, 6B, 6C, and 6D.

OTA tuner system 705 is illustrated as positioned on a top floor of environment 700, which may allow for better reception of broadcast signal 710 than if OTA tuner system 705 was positioned on a middle or lower floor of environment 700. OTA tuner system 705 plugs into outlet 715, which may provide either or both a power connection and a powerline network connection (e.g., G.hn or Homeplug) for OTA tuner system 705. OTA tuner system 705 also connects to network port 720, which may provide a wired network connection between OTA tuner system 705 and a wired network. OTA tuner system 705 is also depicted as transmitting a wireless network signal 725, such as a WiFi signal, which may provide a wireless network connection between OTA tuner system 705 and a wireless network. Other network connections may be implemented, including mixed wired/wireless/powerline networks.

On a middle floor of environment 700, a television 730 is shown connected to a receiver 735. Receiver 735 may represent receiver 150 or receiver 250 of FIGS. 1 and 2, respectively. Receiver 735 may further incorporate aspects of television receiver 900 described below with reference to FIG. 9. Receiver 735 connects to outlet 740, which may provide for network connectivity between receiver 735 and OTA tuner system 705, such as by way of a G.hn or Homeplug powerline network connection. OTA tuner system 705 may relay digital transport streams comprising received television channels in broadcast signal 710 to receiver 735 for display on television 730.

On a lower floor of environment 700, a television 745 is shown. Television 745 may include aspects of receiver 150 or receiver 250 of FIGS. 1 and 2, respectively. Television 745 may further incorporate aspects of television receiver 900 described below with reference to FIG. 9. Television 745 connects to network port 750, which may provide for network connectivity between television 745 and OTA tuner system 705, wired network connection. OTA tuner system 705 may relay digital transport streams comprising received television channels in broadcast signal 710 to television 745 for display. It will be appreciated that while televisions 730 and 745 are depicted as displaying the same program (a baseball game broadcast), in embodiments, each receiver system may receive different transport streams from OTA tuner system 705 and so display different programs.

FIG. 7 also depicts a tablet computer 755 on a lower floor of environment 700. Tablet computer 755 may include aspects of receiver 150, receiver 250, or television receiver 900, for example, and may receive, via wireless signal 760, a transport stream including a received television channel. Here, the transport stream received by tablet computer 755 includes a basketball game broadcast, which is different from the programs received by television 745 and receiver 735. Optionally, the tablet computer 755 includes an application for transmitting commands to OTA tuner system 705 for controlling OTA tuner system 705. For example, such an application may include a network OTA antenna module for implementation of various functionality into tablet computer 755 related to OTA tuner system 705. For example, the network OTA antenna module may allow for control over OTA tuner system 705, such as to request and obtain particular television channels, control tuning characteristics of digital tuners included in OTA tuner system 705, etc. The network OTA antenna module may further control and store user preferences relating to OTA channel reception and viewing.

Figure 8:
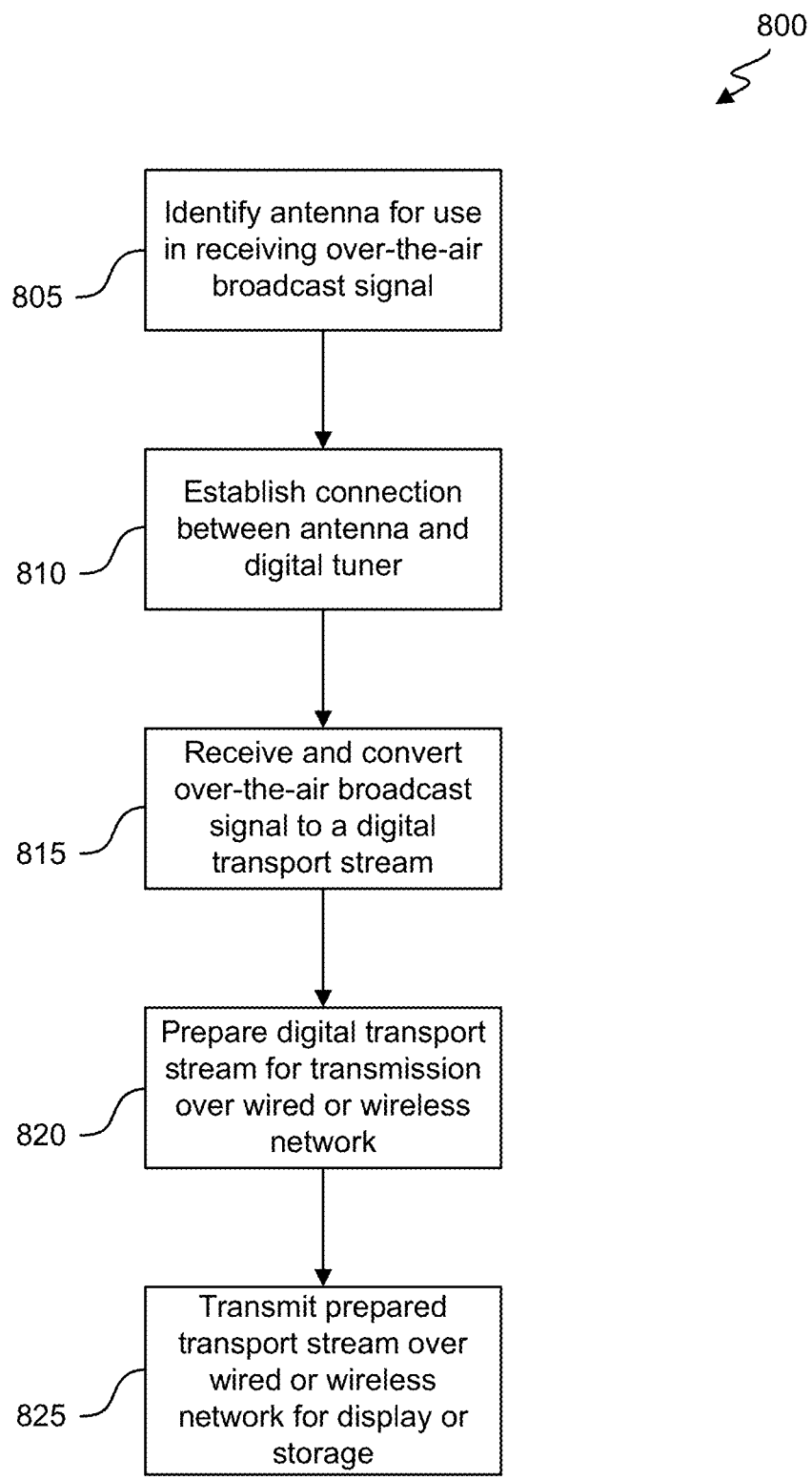
FIG. 8 provides an overview of a method for operating a system for receiving over-the-air broadcast signals, in accordance with some embodiments.

FIG. 8 provides an overview of an exemplary method 800 for operating an OTA tuner system of some embodiments. At block 805, the method includes identifying an antenna for use in receiving an over-the air broadcast signal. Identification of the antenna may include determining the antenna that has the best reception characteristics for a particular broadcast, such as by performing a look-up in a look-up table, such as a look-up table that maps various broadcast frequencies to one of a plurality of antennas. Assembling the look-up table may include scanning each of various broadcast frequencies and receiving signals at each of a plurality of antennas, identifying reception metrics for each of the antenna/frequency pairings and selecting a best reception metric and associated antenna for a particular frequency.

At block 810, a connection between the identified antenna and a digital tuner is established. It will be appreciated that the connection may be made using a switch matrix/splitter, for example. Although the present disclosure refers to reception of digital OTA broadcast television signals, it will be appreciated that the systems and methods disclosed herein may also apply to reception of digital OTA broadcast radio (audio) signals, also known as HD-Radio. It will also be appreciated that the systems and methods disclosed herein may also apply to analog OTA broadcast television and radio (audio) signals.

At block 815, the over-the-air broadcast signal is received, such as by using the identified antenna, and converted to a digital transport stream, such as by using a digital tuner. The transport stream may include a plurality of television channels, as described above, and only a single channel may be desired for transmitting over a network to a display device, receiver, or storage device, such as a digital video recorder (DVR).

At block 820, the digital transport stream is prepared for transmission over a wired or wireless network. Preparation may include demultiplexing, multiplexing, encoding, decoding, rate adaptation, and the like in order to provide a suitable network stream for transmission to a display device, receiver, or storage device. In some embodiments, multiple television channels received, such as using one or more tuners and one or more antennas may be combined into a single network transport stream.

At block 825, the prepared transport stream is transmitted over a wired or wireless network for reception by a receiver, display by a display device, or storage by a data store.

FIG. 9 illustrates an embodiment of a television receiver 900 that receive and display video from a system for receiving over-the-air broadcast signals. Embodiments of television receiver 900 may include set top boxes (STBs). As previously noted, in addition to being in the form of a STB, a television receiver may be incorporated as part of another device, such as a television or other form of display device, such as a computer, smartphone, or tablet. For example, a television may have an integrated television receiver (which does not involve an external STB being coupled with the television).

Television receiver 900 may represent television receiver 150 of FIG. 1 or receiver 250 of FIG. 2 and may be in the form of a STB that communicates with a display device such as a television. Television receiver 900 may be incorporated as part of a television, such as display device 160 of FIG. 1 or display device 260 of FIG. 2. Television receiver 900 may include: processors 910 (which may include control processor 910-1, tuning management processor 910-2, and possibly additional processors), tuners 915, network interface 920, non-transitory computer-readable storage medium 925, electronic programming guide (EPG) database 930, networking information table (NIT) 940, digital video recorder (DVR) database 945 (which may include provider-managed television programming storage and/or user-defined television programming), on-demand programming 927, network OTA antenna module 932, commercial database 946, user interface 950, over-the-air tuner system 251, which may be connected via network interface 920 and may represent a system for receiving over-the-air broadcast signals, decryption device 960, decoder module 933, television interface 935, and/or descrambling engine 965. In other embodiments of television receiver 900, fewer or greater numbers of components may be present. It should be understood that the various components of television receiver 900 may be implemented using hardware, firmware, software, and/or some combination thereof. Functionality of components may be combined; for example, functions of descrambling engine 965 may be performed by tuning management processor 910-2. Further, functionality of components may be spread among additional components; for example, PID filters 955 may be handled by separate hardware from program map table 957.

Processors 910 may include one or more specialized and/or general-purpose processors configured to perform processes such as tuning to a particular channel, accessing and displaying EPG information from EPG database 930, and/or receiving and processing input from a user. For example, processors 910 may include one or more processors dedicated to decoding video signals from a particular format, such as MPEG, for output and display on a television and for performing decryption, if required. It should be understood that the functions performed by various modules of FIG. 9 may be performed using one or more processors.

As such, for example, functions of descrambling engine 965 may be performed by control processor 910-1.

Control processor 910-1 may communicate with tuning management processor 910-2. Control processor 910-1 may control the recording of television channels based on timers stored in DVR database 945. Control processor 910-1 may also provide commands to tuning management processor 910-2 when recording of a television channel is to cease. In addition to providing commands relating to the recording of television channels, control processor 910-1 may provide commands to tuning management processor 910-2 that indicate television channels to be output to decoder module 933 for output to a display device. Control processor 910-1 may also communicate with network interface 920 and user interface 950. Control processor 910-1 may handle incoming data from network interface 920, including network transport streams received from OTA tuner system 951. Control processor 910-1 may handle incoming data from network interface 920, including network transport streams received from user interface 950, which may include user input received by way of one or more human interface devices. Additionally, control processor 910-1 may be configured to output data via network interface 920.

Tuners 915 may include one or more tuners used to tune to transponders that include broadcasts of one or more television channels that may be received from a satellite or cable system, for example. In the illustrated embodiment of television receiver 900, three tuners are present (tuner 915-1, tuner 915-2, and tuner 915-3). In other embodiments, two or more than three tuners may be present, such as four, six, or eight tuners. Each tuner contained in tuners 915 may be capable of receiving and processing a single transponder stream from a satellite transponder at a given time, for example. As such, a single tuner may tune to a single transponder stream at a given time. If tuners 915 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 915 may be used to receive the signal containing the multiple television channels for presentation and/or recording. Tuners 915 may receive commands from tuning management processor 910-2. Such commands may instruct tuners 915 which frequencies are to be used for tuning.

Network interface 920 may be used to communicate via an alternate communication channel with a television service provider, if such communication channel is available. The primary communication channel may be via satellite (which may be unidirectional to television receiver 900) and the alternate communication channel (which may be bidirectional) may be via a network, such as the Internet. Referring back to FIG. 1, receiver 150 may be able to communicate with television service provider system 110 via a network, such as the Internet. This communication may be bidirectional: data may be transmitted from receiver 150 to television service provider system 110 and from television service provider system 110 to receiver 150. Referring back to FIG. 9, network interface 920 may be configured to communicate via one or more networks, such as the Internet, to communicate with television service provider system 110 of FIG. 1.

Other information may be transmitted and/or received via network interface 920. For example, commands may be transmitted to OTA tuner system 951, such as commands to select from a plurality of antennas and to tune a tuner included in OTA tuner system 951 to a particular frequency to receive a particular OTA broadcast on the particular frequency. Network transport streams may also be received via network interface 920, such as from OTA tuner system 951. Receiving network transport streams using network interface 920 may be advantageous because this configuration may allow OTA tuner system 951 to be placed at a remote location from the television receiver 900, which may allow for better reception of OTA broadcast signals than may be available at the location of television receiver 900. Further, the configuration may allow OTA tuner system to provide one or more network transport streams to one or more television receivers at the same or different times. It will be appreciated that OTA tuner system 951 may correspond to an external device separate from television receiver 900, such as the OTA tuner systems 300, 400, 600 described above.

Storage medium 925 may represent one or more non-transitory computer-readable storage mediums. Storage medium 925 may include memory and/or a hard drive. Storage medium 925 may be used to store information received from one or more satellites and/or information received via network interface 920. Storage medium 925 may store information related to EPG database 930, network OTA antenna module 932 and related preferences, other non-video/audio data 931, DVR database 945, commercial database 946, and/or on-demand programming 927. Recorded television programs may be stored using storage medium 925 as part of DVR database 945. Storage medium 925 may be partitioned or otherwise divided (such as into folders) such that predefined amounts of storage medium 925 are devoted to storage of television programs recorded due to user-defined timers and stored television programs recorded due to provider-defined timers.

EPG database 930 may store information related to television channels and the timing of programs appearing on such television channels. EPG database 930 may be stored using storage medium 925, which may be a hard drive. Information from EPG database 930 may be used to inform users of what television channels or programs are popular and/or provide recommendations to the user. Information from EPG database 930 may provide the user with a visual interface displayed by a television that allows a user to browse and select television channels and/or television programs for viewing and/or recording. Information used to populate EPG database 930 may be received via network interface 920 and/or via satellites, such as satellites 130 of FIG. 1 via tuners 915. Alternatively or additionally, information used to populate EPG database 930 may be received via antennas, such as antenna 240 of FIG. 2. For instance, updates to EPG database 930 may be received periodically via satellite or antenna. EPG database 930 may serve as an interface for a user to control DVR functions of television receiver 900, and/or to enable viewing and/or recording of multiple television channels simultaneously.

Network OTA antenna module 932 (also referred to herein as a NOA module) may implement various functionality into television receiver 900 related to OTA tuner system 951. For example, network OTA antenna module 932, may allow for direct integration of television channels received by OTA tuner system 951 into an electronic program guide. Further network OTA antenna module 932 may allow for control over OTA tuner system 951, such as to request and obtain particular television channels, control tuning characteristics of digital tuners included in OTA tuner system 951, etc. Network OTA antenna module 932 may further control and store user preferences relating to OTA channel reception and viewing.

The network information table (NIT) 940 may store information used by television receiver 900 to access various television channels. NIT 940 may be stored locally by a processor, such as tuning management processor 910-2 and/or by storage medium 925. Information used to populate NIT 940 may be received via satellite (or cable) through tuners 915, may be received via network interface 920, such as from the television service provider, and/or via antenna or OTA tuner system 951. As such, information present in NIT 940 may be periodically updated. In some embodiments, NIT 940 may be locally-stored by television receiver 900 using storage medium 925. Generally, NIT 940 may store information about a service provider network, such as a satellite-based service provider network. Information that may be present in NIT 940 may include: television channel numbers, satellite identifiers (which may be used to ensure different satellites are tuned to for reception of desired television channels), frequency identifiers, transponder identifiers for various television channels, antenna identifiers (which may be used to ensure different antennas are tuned to for reception of desired television channels), radio frequency identifiers, and/or subchannel identifiers for various television channels. In some embodiments, NIT 940 may contain additional data or additional tables may be stored by the television receiver. For example, while specific audio PIDs and video PIDs may not be present in NIT 940, a channel identifier may be present within NIT 940 which may be used to look up the audio PIDs and video PIDs in another table, such as a program map table (PMT). In some embodiments, a PID associated with the data for the PMT is indicated in a separate table, program association table (PAT), which is not illustrated in FIG. 9. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder stream, transport stream, or digital broadcast. If, for a first television channel, multiple television channels are to be tuned to, NIT 940 and/or PMT 957 may indicate a second television channel that is to be tuned to when a first channel is tuned to; this may allow for switching to output of the second television channel for different commercials, for example.

A table, such as the NIT, PAT, or PMT may store indications of PIDs that are related to supplemental audio content for individual channels or other forms of content. For instance, each television channel may be associated with a different supplemental audio PID. If supplemental audio content is to be transmitted for a given television channel, packets containing the supplemental audio are transmitted to the television receiver having its associated supplemental audio content PID. This PID could be distinct from any of the audio programs of the television programming (e.g., the first audio program, second audio program (SAP)). In some embodiments, supplemental audio content is transmitted using the same transponder stream as the television channel or content to which the supplemental audio content corresponds. In some embodiments, a single supplemental audio PID is used to identify supplemental audio for multiple television channels, such as all the television channels on a given transponder. A second identifier present within the supplemental audio data may be used to distinguish for which television channel the supplemental audio data corresponds.

Based on information in the NIT, it may be possible to determine the proper satellite and transponder to which to tune for a particular television channel, or to determine the proper antenna and frequency to which to tune to for a particular television channel. In some embodiments, the NIT may list a particular frequency to which to tune for a particular television channel. Once tuned to the proper satellite/transponder/antenna/frequency, the PMT PID may be used to retrieve a program map table that indicates the PIDs for audio and video streams of television channels transmitted by that transponder.

While a large portion of storage space of storage medium 925 may be devoted to storage of television programming, a portion may be devoted to storage of non-audio/video data, such as EPG database 930 and other non-video/audio data 931. This "other" data may permit television receiver 900 to function properly. In some embodiments, at least ten gigabytes are allocated to such other data. For example, if NIT 940 is stored by storage medium 925, it may be part of other non-video/audio data 931.

Decoder module 933 may serve to convert encoded video and audio into a format suitable for output to a display device. For instance, Decoder module 933 may receive MPEG video and audio from storage medium 925, network interface 920, or descrambling engine 965 to be output to a television. MPEG video and audio from storage medium 924 may have been recorded to DVR database 945 as part of a previously-recorded television program. Decoder module 933 may convert the MPEG video and audio into a format appropriate to be displayed by a television or other form of display device and audio into a format appropriate to be output from speakers, respectively. Decoder module 933 may have the ability to convert a finite number of television channel streams received from storage medium 925, network interface 920 or descrambling engine 965 simultaneously. For instance, each of decoders 934 within decoder module 933 may be able to only decode a single television channel at a time.

While a television channel is being decoded by a decoder of decoders 934, the television channel is not necessarily output to a display device via television interface 935. For instance, a television channel may be decoded but not output to allow for seamless or near-seamless switching to the television channel when output is desired. For example, if a second television channel is to be output for presentation during commercial breaks on a first television channel, the second television channel and the first television channel may each be continuously decoded by different decoders of decoder module 933 to allow for fast switching between the channels. Without a television channel being continuously decoded, fast switching may be difficult due at least in part to the format in which the channel is encoded. For instance, for MPEG encoding, it may be necessary to first decode an I-frame before certain subsequent (or earlier) received frames may be properly decoded. The output of the decoder, which is provided to television interface 935, may be controlled by control processor 910-1 or some other processor. While decoder module 933 is illustrated as having three decoders 934 (decoder 934-1, decoder 934-2, and decoder 934-3), in other embodiments, a greater or fewer number of decoders may be present in television receiver 900.

Television interface 935 may serve to output a signal to a television (or another form of display device) in a proper format for display of video and playback of audio. As such, television interface 935 may output one or more television channels, stored television programming from storage medium 925 (e.g., television programs from DVR database 945, television programs from on-demand programming 927 and/or information from EPG database 930) to a television for presentation.

Digital Video Recorder (DVR) functionality may permit a television channel to be recorded for a period of time. DVR functionality of television receiver 900 may be managed by control processor 910-1. Control processor 910-1 may coordinate the television channel, start time, and stop time of when recording of a television channel is to occur. DVR database 945 may store information related to the recording of television channels. DVR database 945 may store timers that are used by control processor 910-1 to determine when a television channel should be tuned to and its programs recorded to DVR database 945 of storage medium 925. In some embodiments, a limited amount of storage medium 925 may be devoted to DVR database 945. Timers may be set by the television service provider and/or one or more users of television receiver 900.

DVR database 945 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 900 via the television provider's network. For example, referring to satellite television distribution system 100 of FIG. 1, in a satellite-based television service provider system, data necessary to create the provider-defined timers at receiver 150 may be received via satellite.

As an example of DVR functionality of television receiver 900 being used to record based on provider-defined timers, a television service provider may configure television receiver 900 to record television programming on multiple, predefined television channels for a predefined period of time, on predefined dates. For instance, a television service provider may configure television receiver 900 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 925 for provider-managed television programming storage.

On-demand programming 927 may represent additional television programming stored by storage medium 925. On-demand programming 927 may include television programming that was not recorded to storage medium 925 via a timer (either user- or provider-defined). Rather, on-demand programming is programming provided to the television receiver directly for storage by the television receiver and for later presentation to one or more users. On-demand programming 927 may not be user-selected. As such, the television programming stored to on-demand programming storage 927 may be the same for each television receiver of a television service provider.

User interface 950 may include a remote control (physically separate from television receiver 900) and/or one or more buttons on television receiver 900 that allow a user to interact with television receiver 900. User interface 950 may be used to select a television channel for viewing, view information from EPG database 930, and/or program a timer stored to DVR database 945, wherein the timer is used to control the DVR functionality of control processor 910-1. User interface 950 may also be used to transmit commands to television receiver 900.

Referring back to tuners 915, television channels received via satellite (or cable) may contain at least some scrambled data. Packets of audio and video may be scrambled to prevent unauthorized users (e.g., nonsubscribers) from receiving television programming without paying the television service provider. When a tuner of tuners 915 is receiving data from a particular transponder of a satellite, the transponder stream may be a series of data packets corresponding to multiple television channels. Each data packet may contain a packet identifier (PID), which, in combination with NIT 940 and/or PMT 957, may be determined to be associated with a particular television channel. Particular data packets, referred to as entitlement control messages (ECMs), may be periodically transmitted. ECMs may be associated with another PID and may be encrypted; television receiver 900 may use decryption device 960 to decrypt ECMs. Decryption of an ECM may only be possible if the user has authorization to access the particular television channel associated with the ECM. When an ECM is determined to correspond to a television channel being stored and/or displayed, the ECM may be provided to decryption device 960 for decryption.

Decryption device 960 may be a removable or non-removable smart card. When decryption device 960 receives an encrypted ECM, decryption device 960 may decrypt the ECM to obtain some number of control words. In some embodiments, from each ECM received by decryption device 960, two control words are obtained. In some embodiments, when decryption device 960 receives an ECM, it compares the ECM to the previously received ECM. If the two ECMs match, the second ECM is not decrypted because the same control words would be obtained. In other embodiments, each ECM received by decryption device 960 is decrypted; however, if a second ECM matches a first ECM, the outputted control words will match; thus, effectively, the second ECM does not affect the control words output by decryption device 960. Decryption device 960 may be permanently part of television receiver 900 or may be configured to be inserted and removed from television receiver 900. In some embodiments, control processor 910-1, tuning management processor 910-2, or other hardware may be able to determine that a received ECM has not changed from the previous iteration, and therefore not provide the repeated ECM to the smart card, since the same control word(s) will be obtained.

Tuning management processor 910-2 may be in communication with tuners 915 and control processor 910-1. Tuning management processor 910-2 may be configured to receive commands from control processor 910-1. Such commands may indicate when to start/stop recording a television channel and/or when to start/stop causing a television channel to be output to a television. Tuning management processor 910-2 may control tuners 915. Tuning management processor 910-2 may also control OTA tuner system 951. Tuning management processor 910-2 may provide commands to tuners 915 or OTA tuning system 951 that instruct the tuners which satellite, transponder, antenna, and/or frequency to tune to. From tuners 915, tuning management processor 910-2 may receive transponder streams of packetized data. From network interface 920, tuning management processor 910-2 may receive network transport stream of packetized data. As previously detailed, some or all of these packets may include a PID that identifies the content of the packet.

Tuning management processor 910-2 may be configured to create one or more PID filters 955 that sort packets received from tuners 915 and/or network interface 920 based on the PIDs. When a tuner is initially tuned to a particular frequency (e.g., to a particular transponder of a satellite), a PID filter may be created based on the PMT data. The PID created, based on the PMT data packets, may be known because it is stored as part of NIT 940 or another table, such as a program association table (PAT). From the PMT data packets, PMT may be constructed by tuning management processor 910-2.

PID filters 955 may be configured to filter data packets based on PIDs. In some embodiments, PID filters 955 are created and executed by tuning management processor 910-2. For each television channel to be output for presentation or recorded, a separate PID filter may be configured. In other embodiments, separate hardware may be used to create and execute such PID filters. Depending on a television channel selected for recording/viewing, a PID filter may be created to filter: (1) the video packets associated with the television channel; (2) the audio packets associated with the television channel; and (3), if enabled, supplemental audio content for use in conjunction with interactive content. PMT 957 may store the particular assignments of PIDs for individual television channels. For example, if a transponder data stream includes multiple television channels, data packets corresponding to a television channel that is not desired to be stored or displayed by the user may be ignored by PID filters 955 and not routed to descrambling engine 965, decryption device 960 or control processor 910-1. As such, only data packets corresponding to the one or more television channels desired to be stored and/or displayed may be filtered and passed to either descrambling engine 965 or decryption device 960; other data packets may be ignored. For each television channel, a stream of video packets, a stream of audio packets (one or both of the audio programs), a stream of supplemental audio content, and/or a stream of ECM packets may be present, each stream identified by a PID. In some embodiments, a common ECM stream may be used for multiple television channels. Additional data packets corresponding to other information, such as updates to NIT 940, may be appropriately routed by PID filters 955. At a given time, one or multiple PID filters may be executed by tuning management processor 910-2.

Descrambling engine 965 may use the control words output by decryption device 960 in order to descramble video and/or audio corresponding to television channels for storage and/or presentation. Video and/or audio data contained in the transponder data stream received by tuners 915 may be scrambled. Video and/or audio data may be descrambled by descrambling engine 965 using a particular control word. Which control word output by decryption device 960 to be used for successful descrambling may be indicated by a scramble control identifier present within the data packet containing the scrambled video or audio. Descrambled video and/or audio may be output by descrambling engine 965 to storage medium 925 for storage (in DVR database 945) and/or to decoder module 933 for output to a television or other presentation equipment via television interface 935.

For simplicity, television receiver 900 of FIG. 9 has been reduced to a block diagram; commonly known parts, such as a power supply, have been omitted. Further, some routing between the various modules of television receiver 900 has been illustrated. Such illustrations are for exemplary purposes only. The state of two modules not being directly or indirectly connected does not indicate the modules cannot communicate. Rather, connections between modules of the television receiver 900 are intended only to indicate possible common data routing. It should be understood that the modules of television receiver 900 may be combined into a fewer number of modules or divided into a greater number of modules.

Figure 10:
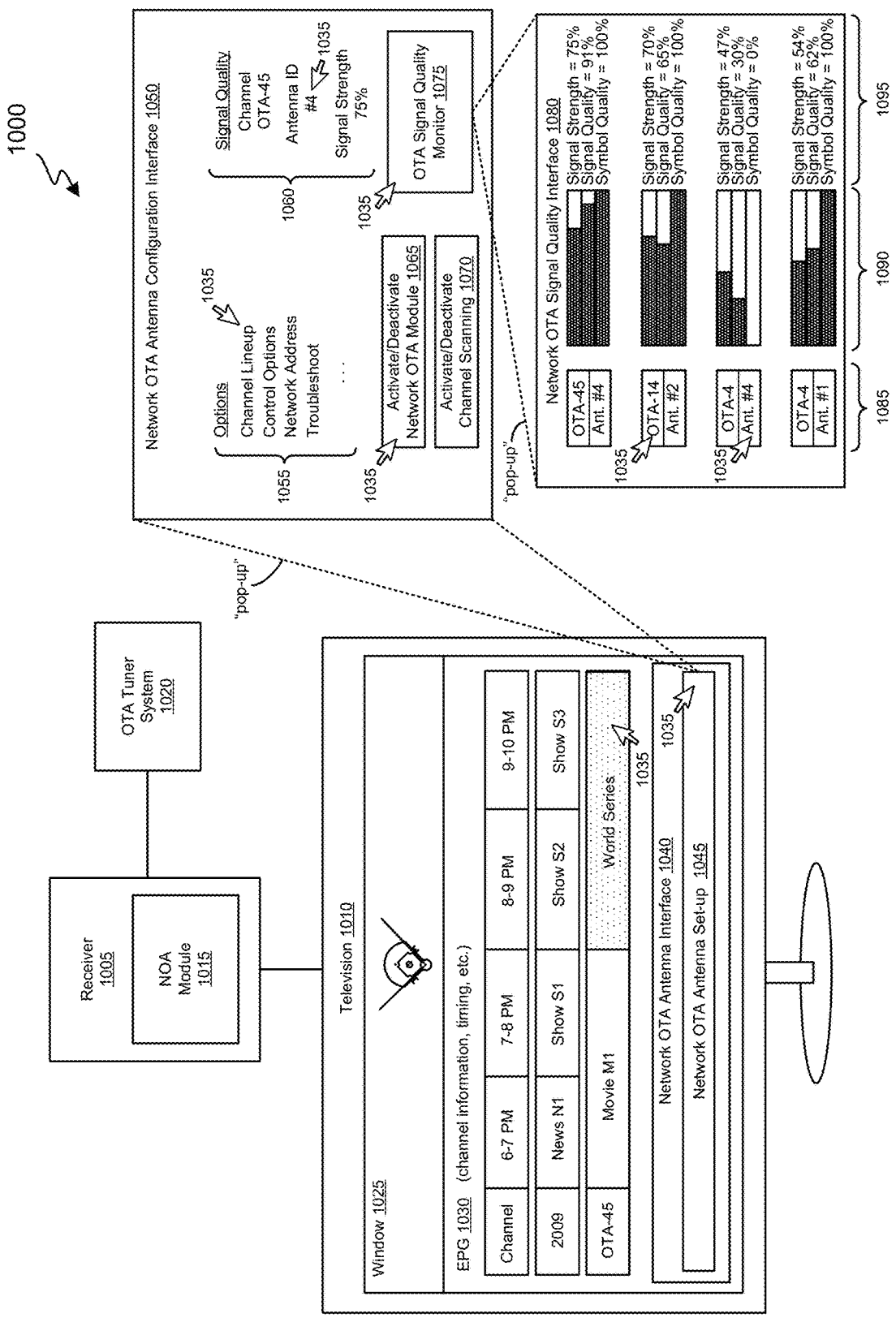
FIG. 10 provides a schematic illustration of aspects of a television receiver that uses a system for receiving over-the-air broadcast signals, in accordance with some embodiments.

FIG. 10 depicts an example television display environment 1000. Display environment 1000 includes a receiver 1005 that generates a user interface for output by television 1010. Receiver 1005 includes network over-the-air (NOA) module 1015, which may provide an interface for receiving and displaying transport streams from OTA tuner system 1020.

In FIG. 10, television 1010 displays a window 1025 that includes video, such as video corresponding to a television channel received from a satellite or OTA Tuner system 1020. Television 1010 also displays an electronic program guide (EPG) 1030, which corresponds to channel information, timing of programs, and the like, for television programs and channels that may be displayed by receiver 1005 and television 1010. As illustrated, the EPG 1030 identifies a first channel "2009," which may correspond, for example, to a satellite television channel, and a second channel "OTA-45," which may correspond, for example, to a broadcast television channel received using OTA tuner system 1020. Items in the EPG 1030 may be selectable using a user interface that may make use of a remote control or other input device to interact with EPG 1030. As illustrated, indicator 1035 may highlight, as an example program, the World Series for immediate display on television 1010, such as in window 1025. Other features may also be implemented using the interface displayed, such as selection of recording one or more television channels or programs for storage to a DVR database.

The display interface may also include an network OTA antenna interface 1040, which may allow for selection of a network OTA antenna set-up item 1045 to command the receiver to configure the NOA module 1015, for example. As an example, selection of the command to configure the NOA module 1015, may generate a "pop-up" window or other interface that allows for interaction and control over configuration or information aspects relating to NOA module 1015 and OTA tuner system 1020. In the network OTA antenna configuration interface 1050 that is generated, options 1055 may be selected, activated, changed, or displayed, for example. Useful options 1055 may include, but are not limited to, viewing or management of a channel line-up, control options for NOA module 1015 or OTA tuner system 1020, information relating to or control over a network address, such as a network address of OTA tuner system 1020, and an option for troubleshooting NOA module 1015 or OTA tuner system 1020.

Also included in network OTA antenna configuration interface 1050 may be an informational item 1060 that may provide useful reception metrics for a particular channel to aid in optimizing a position, orientation, or location of OTA tuner system 1020. Informational item may allow for selection of a particular OTA channel or broadcast frequency, selection of a particular antenna panel included in OTA tuner system 1020, and display of a received signal strength or reception metric that may be updated in real time. In this way, a user may be able to identify an optimal antenna position, orientation, or location manually, which may allow for better overall reception of OTA broadcast signals.

Network OTA antenna configuration interface 1050 may also include an option 1065 for activating or deactivating the NOA module 1015, such as to add/or remove interface features of receiver 1005 that relate to NOA module 1015 and/or OTA tuner system 1020. Network OTA antenna configuration interface 1050 may also include an option 1070 for activating or deactivating other specific features of NOA module 1015 and/or OTA tuner system 1020, such as channel scanning feature, a program repair feature, etc.

The display interface may also include an OTA signal quality monitor item 1075 to allow for simultaneous monitoring of a quality metric for a plurality channels and a plurality of antennas in real-time, for example. As an example, selection of the OTA signal quality monitor item 1075 may generate a "pop-up" window or other interface that allows for interaction and control over configuration or information aspects relating to monitoring quality metrics of OTA channels received by OTA tuner system 1020. In the network OTA signal quality interface 1080 that is generated, channel and antenna combinations 1085 may be selected, activated, changed, or displayed, for example. Graphical indicators 1090 of one or more quality metrics may be displayed and updated in real-time. Textual indicators 1095 of one or more quality metrics may be displayed and updated in real-time. In this way, a user may be able view the quality metrics and how they are changed as the location or orientation of the OTA tuner system 1020 or an antenna or antenna panel of the OTA tuner system are adjusted in order to optimize the reception of one or more channels. Advantageously, quality metrics for the same channel but using different antennas may be displayed to allow for determination of which antenna may be best suited for reception of a particular channel. In FIG. 10, quality metrics for the channel "OTA-4" are shown using both antenna #4 and antenna #1. Advantageously, quality metrics for different channels using the same antenna may be displayed to allow for determination of which channels may be best received by a particular antenna. In FIG. 10, quality metrics for the channel "OTA-45" and "OTA-4" are both shown using antenna #4.

Figure 11:
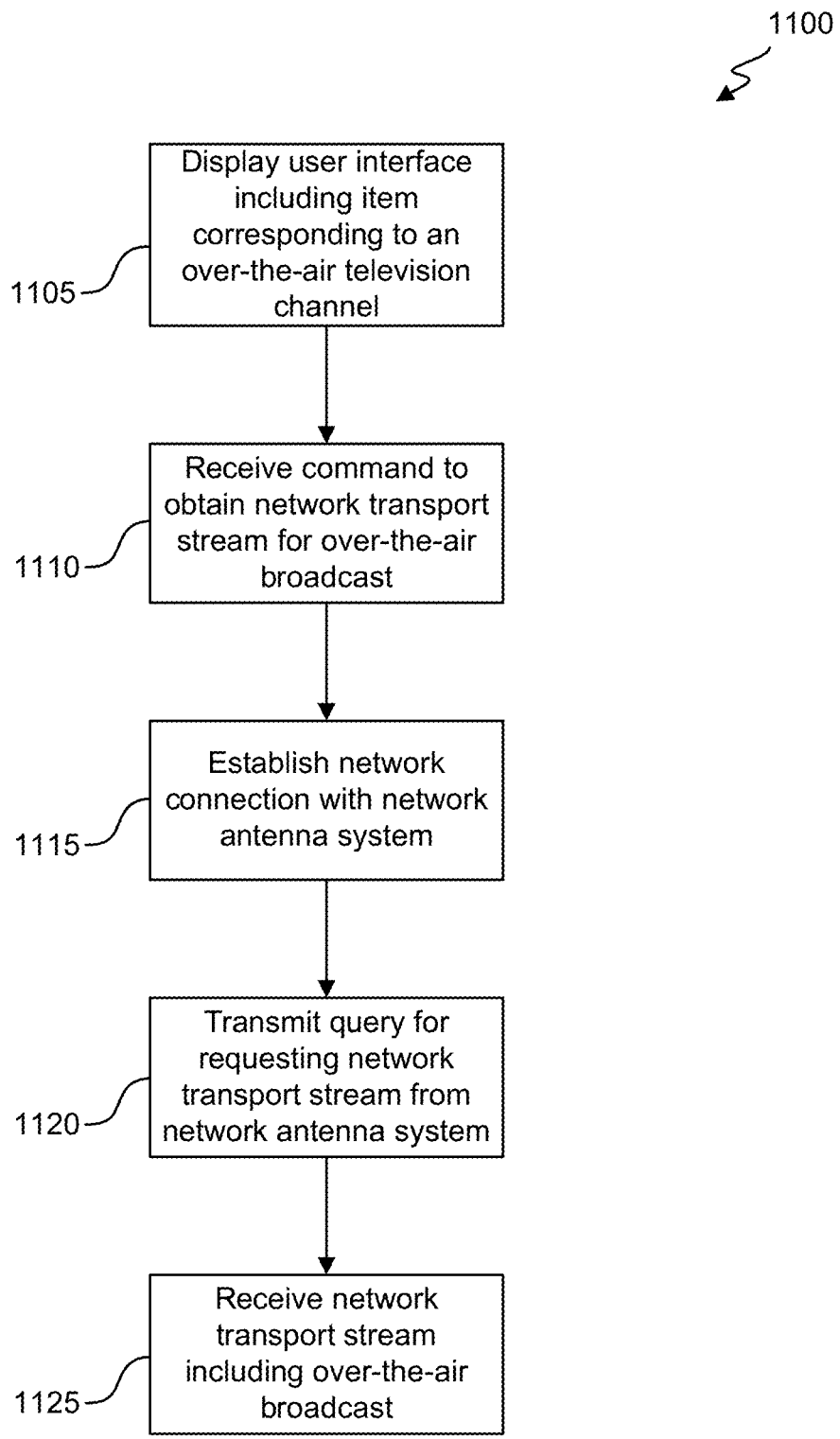
FIG. 11 provides an overview of a method for operating a television receiver that uses a system for receiving over-the-air broadcast signals, in accordance with some embodiments.

FIG. 11 provides an overview of an exemplary method 1100 for operating a receiver of some embodiments. At block 1105, the method includes displaying a user interface including an item corresponding to an over-the-air television channel or a television program received by way of an over-the-air broadcast.

At block 1110, a command is received to obtain a network transport stream for an over-the-air broadcast. For example, the command may correspond to user input received by way of a remote control or other input device. The command may correspond, for example, selection of the item included in the user interface corresponding to the over-the-air television channel.

At block 1115, a network connection is established between the receiver and a network antenna system. The network connection may be or include a wired or wireless network connection. In some embodiments, a combination of wired and wireless networks are used to establish the connection between the receiver and the network antenna system.

At block 1120, a query that requests a network transport stream is transmitted to the network antenna system. The query may correspond to a request for a network transport stream corresponding to or including one or more over-the-air television channels or programs received by way of an over-the-air television broadcast. The over-the-air television channels over-the-air television broadcasts may be obtained and multiplexed by the network antenna system to generate the network transport stream.

At block 1125, a network transport stream including an over-the-air broadcast television channel is received. The network transport stream may correspond to one or more television channels or programs. Upon reception, all or portions the network transport stream may be processed for immediate output, such as by a television or other display device. Optionally, all or portions of the network transport stream may be stored to memory, such as to a DVR database for later selection and display.

Figure 12:
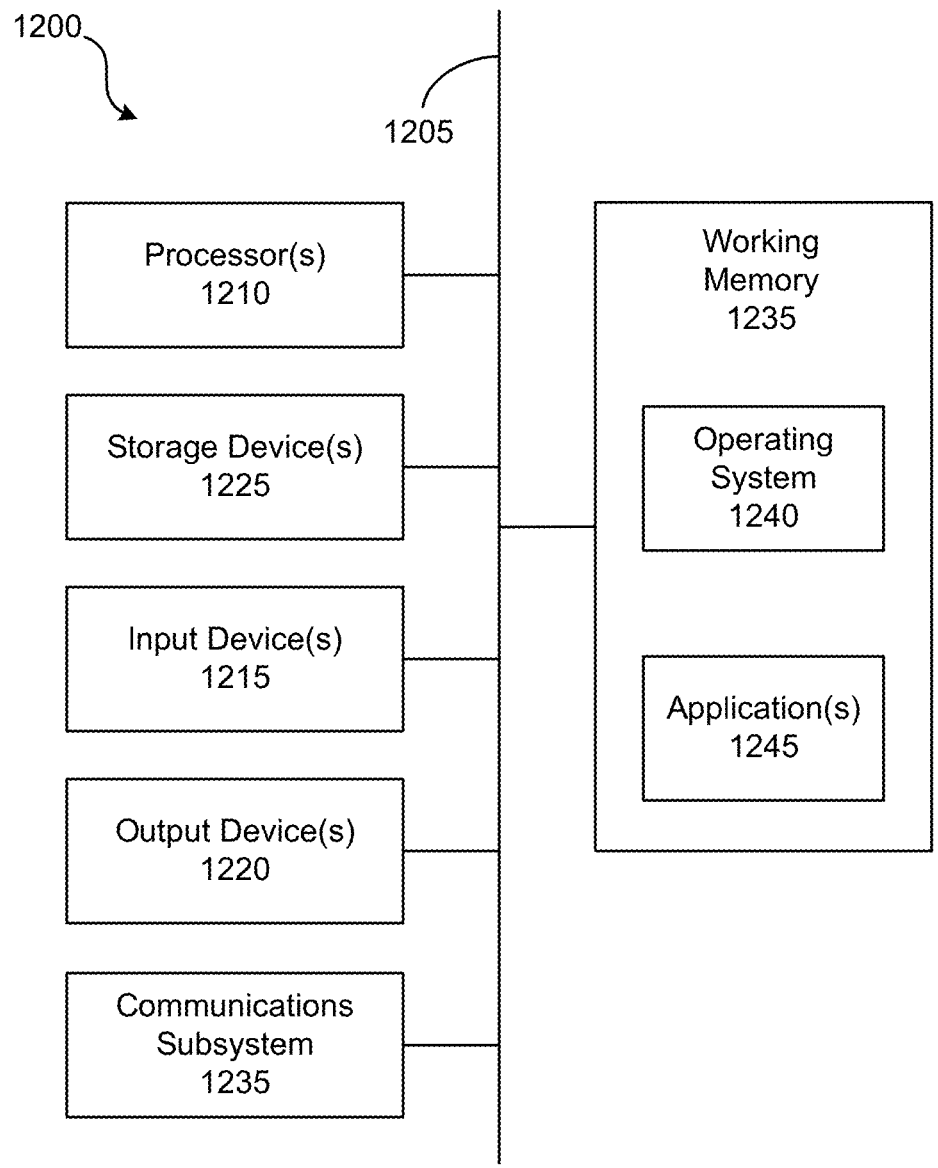
FIG. 12 provides a block diagram of an example computing device, in accordance with some embodiments.

A computing device as illustrated in FIG. 12 may be incorporated as part of the previously described computerized devices, such as television service provider system 110, content provider system 111, receiver 150, OTA tuner system 951, etc. FIG. 12 provides a schematic illustration of one embodiment of a computing device 1200 that may perform various steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computing device 1200 is shown comprising hardware elements that may be electrically coupled via a bus 1205 (or may otherwise be in communication). The hardware elements may include one or more processors 1210, including without limitation one or more general-purpose processors and/or one or more special-purpose processors (such as digital signal processing chips, graphics acceleration processors, video decoders, and/or the like); one or more input devices 1215, which may include without limitation a mouse, a touchscreen, keyboard, remote control, and/or the like; and one or more output devices 1220, which may include without limitation a display device, a printer, etc.

The computing device 1200 may further include (and/or be in communication with) one or more non-transitory storage devices 1225, which may comprise, without limitation, local and/or network accessible storage, and/or may include, without limitation, a disk drive, a drive array, an optical storage device, a solid-state storage device, such as a solid state drive ("SSD"), random access memory ("RAM"), and/or a read-only memory ("ROM"), which may be programmable, flash-updateable and/or the like. Such storage devices may be configured to implement any appropriate data stores, including without limitation, various file systems, database structures, and/or the like.

The computing device 1200 might also include a communications subsystem 1230, which may include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), a G.hn device, and/or the like. The communications subsystem 1230 may permit data to be exchanged with a network (such as the network described below, to name one example), other computer systems, and/or any other devices described herein. In many embodiments, the computing device 1200 will further comprise a working memory 1235, which may include a RAM or ROM device, as described above.

The computing device 1200 also may comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1225 described above. In some cases, the storage medium might be incorporated within a computer system, such as computing device 1200. In other embodiments, the storage medium might be separate from a computer system (e.g., a removable medium, such as a compact disc), and/or provided in an installation package, such that the storage medium may be used to program, configure, and/or adapt a general purpose computer with the instructions/code stored thereon. These instructions might take the form of executable code, which is executable by the computing device 1200 and/or might take the form of source and/or installable code, which, upon compilation and/or installation on the computing device 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computing device (such as the computing device 1200) to perform methods in accordance with various embodiments of the invention. According to a set of embodiments, some or all of the procedures of such methods are performed by the computing device 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer-readable medium, such as one or more of the non-transitory storage device(s) 1225. Merely by way of example, execution of the sequences of instructions contained in the working memory 1235 might cause the processor(s) 1210 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computing device 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer may read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1200.

The communications subsystem 1230 (and/or components thereof) generally will receive signals, and the bus 1205 then might carry the signals (and/or the data, instructions, etc. carried by the signals) to the working memory 1235, from which the processor(s) 1210 retrieves and executes the instructions. The instructions received by the working memory 1235 may optionally be stored on a non-transitory storage device 1225 either before or after execution by the processor(s) 1210.

It should further be understood that the components of computing device 1200 may be distributed across a network. For example, some processing may be performed in one location using a first processor while other processing may be performed by another processor remote from the first processor. Other components of computing device 1200 may be similarly distributed. As such, computing device 1200 may be interpreted as a distributed computing system that performs processing in multiple locations. In some instances, computing device 1200 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for receiving over-the-air broadcast signals, comprising:
   a plurality of antenna panels, each configured for receiving a same plurality of over-the-air broadcast signals delivered over a same broadcast communication network, each antenna panel having a respective antenna characteristic that impacts receipt of the over-the-air broadcast signals by the antenna panel;
   a plurality of digital tuners in communication with the plurality of antenna panels, the plurality of digital tuners for receiving over-the-air broadcast signals and converting received over-the-air broadcast signals to digital transport streams;
   one or more processors in data communication with the one or more digital tuners; and
   a non-transitory computer readable storage medium in data communication with the one or more processors, wherein the non-transitory computer readable storage medium has, stored thereon:
   a list identifying which of the plurality of antenna panels to use for receiving each of the over-the-air broadcast signals, the list compiled by using at least one of the plurality of digital tuners to scan the over-the-air broadcast signals using each of the plurality of antenna panels, and identifying a reception metric for each of the over-the-air broadcast signals and each of the plurality of antenna panels, such that the list indicates which of the plurality of antenna panels is identified as having the best reception metric with respect to each of the over-the-air broadcast signal; and instructions that, when executed by the one or more processors, cause the one or more processors to perform operations including:

receiving a command to tune to a first of the plurality of over-the-air broadcast signals;

identifying at least a first antenna panel from the plurality of antenna panels for use in receiving the first over-the-air broadcast signal in accordance with querying the list;

directing communicative coupling of the first antenna panel with a first digital tuner of the plurality of digital tuners in response to the command and in accordance with the identifying; and transmitting a network transport stream that includes an digital audio and/or video stream received by the first antenna panel via the first over-the-air broadcast signal and converted to a digital transport stream by the first digital tuner, the network transport stream for receipt by a network device to facilitate presenting by the network device of the digital audio and/or video stream.

2. The system of claim 1, wherein the plurality of antenna panels are incorporated with structural elements of a piece of furniture or home furnishing.

3. The system of claim 2, wherein:
the plurality of digital tuners and the network interface are incorporated with the structural elements of the piece of furniture or home furnishing.

4. The system of claim 3, wherein the piece of furniture or home furnishing comprises a modular lampshade, and wherein the modular lampshade includes a connector for inserting into a light socket, the connector for providing power from the light socket to at least the plurality of digital tuners.

5. The system of claim 4, wherein the modular lampshade includes a socket for receiving a light bulb.

6. The system of claim 1, wherein each of the plurality of antenna panels is a directional antenna, and each of the antenna characteristics corresponds to a different absolute directional orientation.

7. The system of claim 1, wherein each of the plurality of antenna panels has a respective shape, and each of the antenna characteristics corresponds to a different respective shape.

8. The system of claim 1, wherein each of the plurality of antenna panels is a polarized antenna, and each of the antenna characteristics corresponds to a different respective polarization.

9. The system of claim 1, wherein each of the antenna characteristics corresponds to a different antenna type, each different antenna type being at least one of a planar antenna, a directional antenna, an omni-directional antenna, or an amplified antenna.

10. The system of claim 1, further comprising:
a multiplexer in communication with the plurality of digital tuners, the multiplexer for generating the network transport stream using one or more digital transport streams.

11. The system of claim 1, further comprising:
a digital storage device in data communication with the plurality of digital tuners, the digital storage device for storing at least a portion of the digital transport streams.

12. The system of claim 1, wherein the network interface is one or more of a WiFi interface, an Ethernet interface, or a powerline network interface.

13. The system of claim 1, wherein the network interface is a powerline network interface, wherein the system is incorporated into a lamp, and wherein the lamp and the powerline network interface share a line power connection.

14. The system of claim 1, wherein at least one of the plurality of digital tuners is for periodic or aperiodic scanning of each of a plurality of over-the-air broadcast signals using each of the plurality of antenna panels.

15. The system of claim 14, wherein the operations further comprise:
compiling the list automatically, by scanning, using the at least one of the plurality of digital tuners, each of the different over-the-air broadcast signals using each of the plurality of antenna panels, and identifying the reception metric for each of the different over-the-air broadcast signals and each of the plurality of antenna panels.

16. The system of claim 1, further comprising:
a switch matrix in communication with each of the plurality of antenna panels to provide electronically switchable communication with each of the plurality of antenna panels,
wherein the plurality of digital tuners is in communication with the plurality of antenna panels via the switch matrix.

17. The system of claim 1, further comprising:
a network interface to provide data communication between the one or more processors and the plurality of digital tuners.

18. The system of claim 1, further comprising:
a network interface to provide data communication between the one or more processors and the network device.

19. The system of claim 1, wherein:
the identifying comprises identifying multiple antenna panels from the plurality of antenna panels for use in simultaneously receiving the first over-the-air broadcast signal in accordance with querying the list;
the directing communicative coupling comprises directing communicative coupling of the multiple antenna panels concurrently with multiple of the plurality of digital tuners tuned to receive the first over-the-air broadcast signal; and
the transmitting comprises multiplexing a plurality of digital transport streams to generate the network transport stream, each of the plurality of digital transport streams converted by a respective one of the multiple of the plurality of digital tuners.

20. The system of claim 1, wherein:
the identifying comprises identifying multiple antenna panels from the plurality of antenna panels for use in simultaneously receiving multiple of the over-the-air broadcast signal in accordance with querying the list;
the directing communicative coupling comprises directing communicative coupling of the multiple antenna panels concurrently with multiple of the plurality of digital tuners tuned to receive the multiple over-the-air broadcast signals; and
the transmitting comprises multiplexing a plurality of digital transport streams to generate the network transport stream, each of the plurality of digital transport streams corresponding to one of the multiple over-the-air broadcast signals and converted by a respective one of the multiple of the plurality of digital tuners.

21. A method, comprising:
receiving a command to tune to a first of a plurality of over-the-air broadcast signals;
identifying at least a first antenna panel from a plurality of antenna panels for use in receiving a first over-the-air broadcast signal, wherein the plurality of antenna panels are each configured for receiving for receiving a same plurality of over-the-air broadcast signals delivered over a same broadcast communication network, and the identifying includes querying a list identifying which of the plurality of antenna panels to use for receiving different over-the-air broadcast signals, the list compiled by using at least one of a plurality of digital tuners to scan the over-the-air broadcast signals using each of the plurality of antenna panels, and identifying a reception metric for each of the over-the-air broadcast signals and each of the plurality of antenna panels, such that the list indicates which of the plurality of antenna panels is identified as having the best reception metric with respect to each of the over-the-air broadcast signal;
directing communicative coupling between the first antenna panel and a first digital tuner of the plurality of digital tuners in response to the command and in accordance with the identifying; and
transmitting a network transport stream over a network connection, wherein the network transport stream includes a digital audio and/or video stream received by the first antenna panel via the first over-the-air broadcast signal and converted to a digital transport stream by the first digital tuner, and wherein the network transport stream is for receipt by a network device to facilitate presenting by the network device the digital audio and/or video stream.

22. The method of claim 21, further comprising:
compiling the list automatically, by scanning, using the at least one of the plurality of digital tuners, each of the different over-the-air broadcast signals using each of the plurality of antenna panels, and identifying the reception metric for each of the different over-the-air broadcast signals and each of the plurality of antenna panels.

23. The method of claim 21, wherein:
the identifying comprises identifying multiple antenna panels from the plurality of antenna panels for use in simultaneously receiving the first over-the-air broadcast signal in accordance with querying the list;
the directing communicative coupling comprises directing communicative coupling of the multiple antenna panels concurrently with multiple of the plurality of digital tuners tuned to receive the first over-the-air broadcast signal; and
the transmitting comprises multiplexing a plurality of digital transport streams to generate the network transport stream, each of the plurality of digital transport streams converted by a respective one of the multiple of the plurality of digital tuners.

24. The method of claim 21, wherein:
the identifying comprises identifying multiple antenna panels from the plurality of antenna panels for use in simultaneously receiving multiple of the over-the-air broadcast signal in accordance with querying the list;
the directing communicative coupling comprises directing communicative coupling of the multiple antenna panels concurrently with multiple of the plurality of digital tuners tuned to receive the multiple over-the-air broadcast signals; and
the transmitting comprises multiplexing a plurality of digital transport streams to generate the network transport stream, each of the plurality of digital transport streams corresponding to one of the multiple over-the-air broadcast signals and converted by a respective one of the multiple of the plurality of digital tuners.

* * * * *